(12) United States Patent
Tuchman et al.

(10) Patent No.: US 8,478,652 B2
(45) Date of Patent: Jul. 2, 2013

(54) PLATFORM FOR PROVIDING LIFE-CYCLE PRODUCT SUPPORT SERVICES

(75) Inventors: Kenneth D. Tuchman, Englewood, CO (US); Bruce A. Sharpe, Aurora, CO (US); Henry D. Truong, Chelmsford, MA (US)

(73) Assignee: Teletech Holdings, Inc., Englewood, CO (US)

( * ) Notice: Subject to any disclaimer, the term of this patent is extended or adjusted under 35 U.S.C. 154(b) by 59 days.

(21) Appl. No.: 13/185,213

(22) Filed: Jul. 18, 2011

(65) Prior Publication Data

US 2013/0024322 A1   Jan. 24, 2013

(51) Int. Cl.
*G06Q 30/00* (2012.01)
(52) U.S. Cl.
USPC ........................................... 705/26.1
(58) Field of Classification Search
USPC ........................................... 705/26.1
See application file for complete search history.

(56) References Cited

U.S. PATENT DOCUMENTS

| | | | |
|---|---|---|---|
| 6,212,178 B1 | 4/2001 | Beck et al. |
| 6,226,623 B1 | 5/2001 | Schein et al. |
| 6,690,788 B1 | 2/2004 | Bauer et al. |
| 6,819,759 B1 | 11/2004 | Khuc et al. |
| 6,934,381 B1 | 8/2005 | Klein et al. |
| 6,988,126 B2 | 1/2006 | Wilcock et al. |
| 7,165,213 B1 | 1/2007 | Busey |
| 7,418,092 B2 | 8/2008 | Brown |
| 7,450,567 B1 | 11/2008 | Mamnani |
| 7,496,053 B1 | 2/2009 | Seabaugh |
| 7,558,382 B2 | 7/2009 | Torres et al. |
| 7,658,327 B2 | 2/2010 | Tuchman et al. |
| 7,746,362 B2 | 6/2010 | Busey et al. |
| 7,761,321 B2 | 7/2010 | Kannan et al. |
| 7,787,609 B1 | 8/2010 | Flockhart et al. |
| 2006/0171402 A1 | 8/2006 | Moore et al. |
| 2006/0218061 A1 | 9/2006 | Mouline |
| 2007/0041523 A1 | 2/2007 | Paden et al. |
| 2007/0124432 A1 | 5/2007 | Holtzman et al. |
| 2007/0160188 A1 | 7/2007 | Sharpe et al. |
| 2007/0276722 A1 | 11/2007 | Silvera et al. |
| 2007/0293200 A1 | 12/2007 | Roundtree et al. |
| 2008/0040427 A1 | 2/2008 | Shroff et al. |

(Continued)

OTHER PUBLICATIONS

International Search Report and Written Opinion mailed Oct. 5, 2012, for International Application No. PCT/US12/47242, 8 pages.

(Continued)

*Primary Examiner* — Mila Airapetian
(74) *Attorney, Agent, or Firm* — Blakely Sokoloff Taylor & Zafman LLP

(57) ABSTRACT

A service center receives a request for posting a message from a mobile device over a network, the request identifying a first discussion forum and a second discussion forum, the message pertaining to a product previously registered with the service center by a user. The message is transmitted to a first server hosting the first discussion forum over the network, together with first credentials retrieved from a database associated with the service center. The first credentials are to allow the first discussion forum to authenticate the user in order to post the message on the first discussion forum. The message is also transmitted to a second server hosting the second discussion forum over the network, together with second credentials retrieved from the database. The second credentials are to allow the second discussion forum to authenticate the user in order to post the message on the second discussion forum.

18 Claims, 31 Drawing Sheets

U.S. PATENT DOCUMENTS

| | | | |
|---|---|---|---|
| 2008/0052159 | A1 | 2/2008 | Balakrishnan et al. |
| 2008/0074264 | A1 | 3/2008 | Sharpe et al. |
| 2008/0140438 | A1 | 6/2008 | Bares |
| 2008/0195659 | A1 | 8/2008 | Rawle |
| 2008/0222504 | A1* | 9/2008 | Chitturi .................. 715/201 |
| 2009/0089111 | A1 | 4/2009 | Walker et al. |
| 2010/0030881 | A1 | 2/2010 | Moreira Sa de Souza et al. |
| 2010/0205540 | A1 | 8/2010 | Gupta et al. |
| 2010/0332373 | A1 | 12/2010 | Crabtree et al. |
| 2012/0324217 | A1* | 12/2012 | Lan et al. .................. 713/153 |

OTHER PUBLICATIONS

"Afaria OneTouch" iAnywhere Solutions, Inc., Dublin, California, 2005, 2 pages.

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

\* cited by examiner

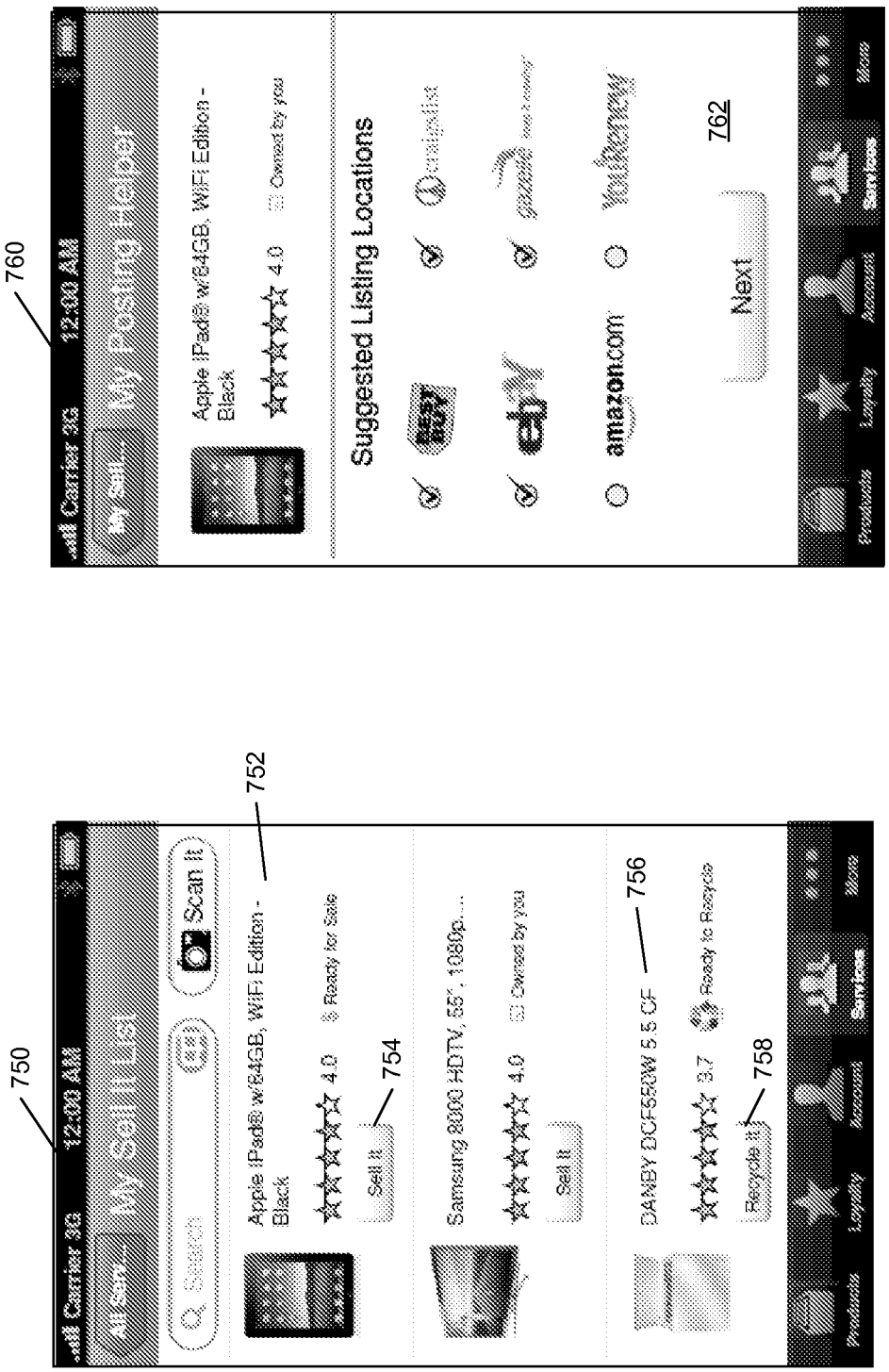

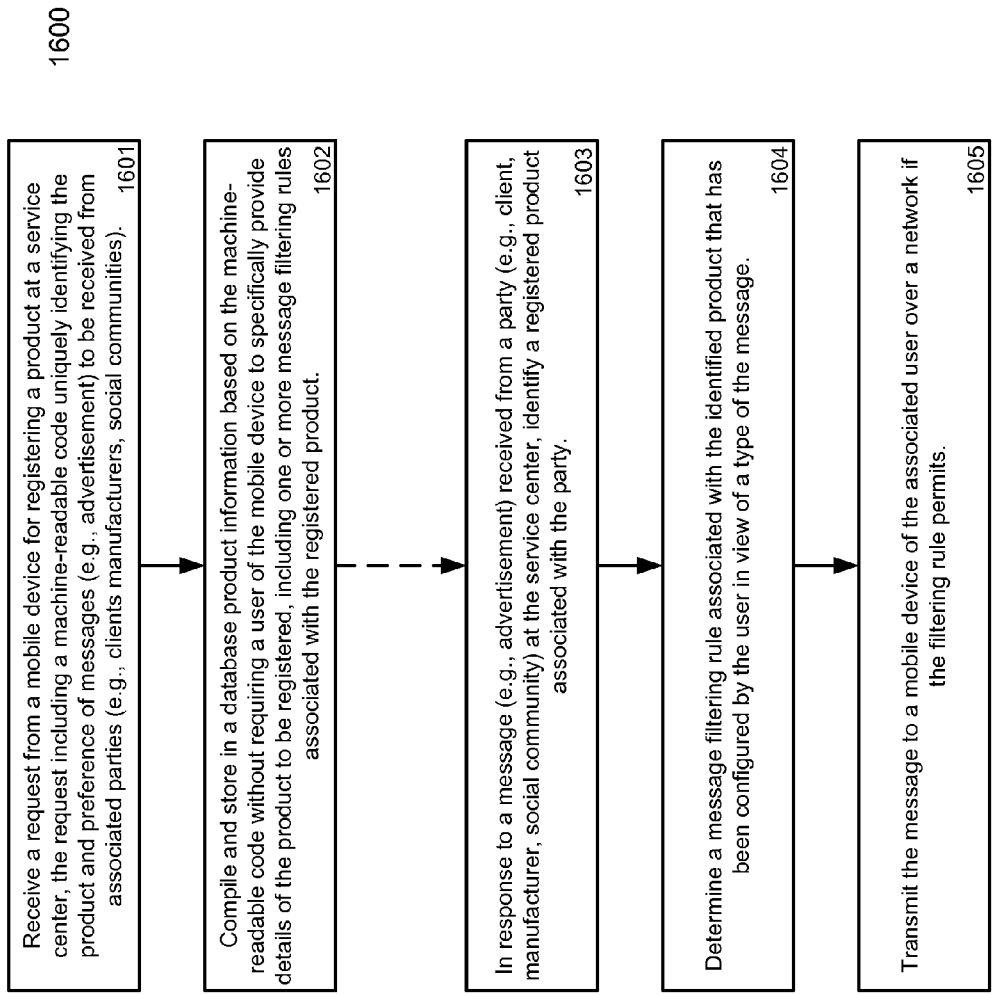

PLATFORM FOR PROVIDING LIFE-CYCLE PRODUCT SUPPORT SERVICES

FIELD OF THE INVENTION

Embodiments of the present invention relate generally to providing product services. More particularly, embodiments of the invention relate to full life cycle product services.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PTSN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

As the Internet is getting more popular, customer service providers now provide for computer-based customer service interaction by way of the World Wide Web. Instead of initiating a customer service session by using the phone, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer.

Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to communicate with customers. Indeed, customers are provided functionality for finding answers to their questions or performing tasks without any help from a live agent. These customer service sessions may be entirely computer-based or, alternatively, involve interaction with a customer service agent.

While there are advantages to performing customer service sessions over the web or other distributed network environments, there has been a lack of efficient platforms to take full advantage of today's technologies, particularly, the mobile technologies. In order to obtain customer support from a service center, the customer is still required to take many steps of manual processes such as a complicated process for registering a product. While there are many ways (e.g., email, chat, voice) to communicate between a customer and an agent, there has been a lack of an efficient mechanism to provide the customer the best available and cost effective communication channels to an agent.

In addition, a typical service center only provides support services to the customers; it does not provide any other services for the customers' products. For example, if a customer decides to dispose a product, a service center would not be able to help the customer. Rather, the customer has to find another channel for disposal of the product, which may require the customer to maintain all the product information such as model number or serial number, etc. Such a process may be tedious, which may lead to improper disposal of the product.

BRIEF DESCRIPTION OF THE DRAWINGS

Embodiments of the invention are illustrated by way of example and not limitation in the figures of the accompanying drawings in which like references indicate similar elements.

FIG. 16 is a flow diagram illustrating a method for processing messages according to one embodiment of the invention.

DETAILED DESCRIPTION

Figure 1:
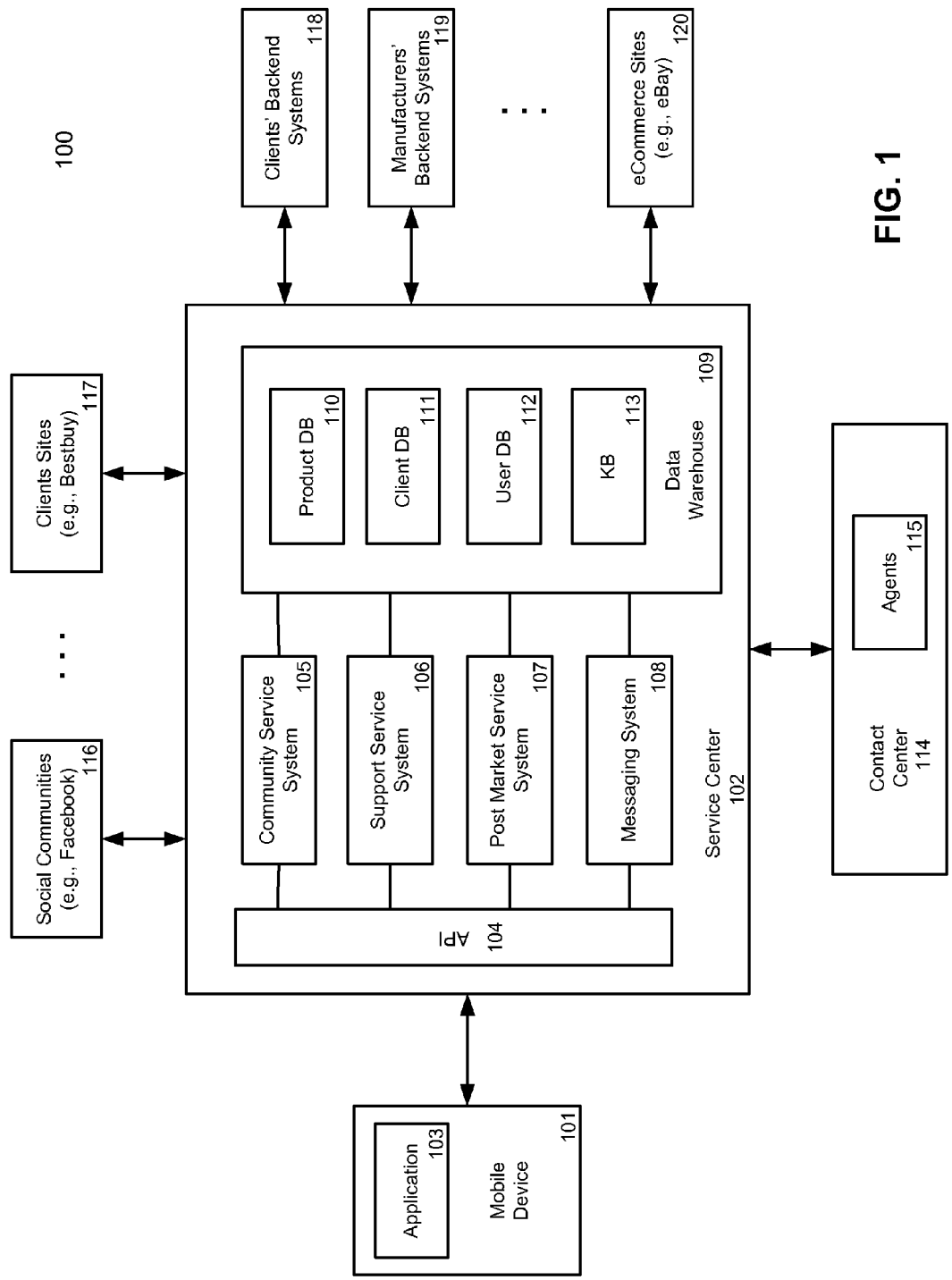
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some aspects, a service center provides a single platform to provide not only support services to a product registered by a user, but also other services such as selling or disposal of the product, participation in a discussion forum associated with the product, and providing advertisements, promotions, rewards, and/or recall associated with the product on behalf of a client or manufacturer. These services can be provided to or initiated from a user through an application running within a mobile device through a variety of communications channels, without having to leave the same application from the mobile device and without requiring the user to provide detailed information about the product.

According to one aspect, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, the service center is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In another aspect, a user can transmit a request from the mobile device to the service center, where the request includes a message to be posted and one or more community identifiers identifying one or more registered social communities. In response, the service center is configured to retrieve the associated credentials from the database and to post the message to the specified social communities together with the associated credentials allow the social communities to authenticate the user, without having to prompt the user for the same credentials.

In another aspect, a user can also configure a set of one or more rules to specify whether certain types of messages received from parties (e.g., retailers, manufacturers, social communities) related to a registered product should be routed to the user. These rules serve as part of message filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, post market service system 107, messaging system 108, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application.

In one embodiment, community service system 105 is responsible for communicating with social communities 116 via an API, for example, to post a message received from a user and to route the responses received from social communities 116 back to the user. Post market service system 107 is responsible for handling post market activities associated with the registered products, including selling a registered product on eCommerce sites 120 and arranging a disposal facility to dispose or recycle the product, etc. Message system 108 is responsible for handling any messages received from a variety of partners or parties, such as client sites 117, client backend systems 118, manufacturer backend systems, and eCommerce sites 120. Messages may be related to the registered products of the user, such as, promotions, rewards, and recall messages.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledge 113 is used to store knowledgebase collected and compiled over a period of time, which can be used by agents 115 and/or users for self-support purposes.

In one embodiment, service center 102 further includes a multi-channel communication system (not shown) to provide one or more communication channels to any user or client to substantially concurrently access service center 102. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication system may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multi-channel communication system.

A customer can obtain support services from service center 102 via a variety of communication mechanisms. A customer can initiate a support request to contact a live agent such as agents 115 in a live manner. Alternatively, a customer may browse certain knowledgebase, such as KB 113 via a Web interface, in an attempt to find a solution to a problem of a product he/she purchased from a manufacturer via a client of service center 102.

According to one embodiment, application 103 is installed on mobile device 101 of a customer or user, where application 103 can serve as a central service point to service center 102 that provides support services to a variety of products or services provided by a variety of vendors. The vendors can be, for example, manufacturers, distributors, retailers, service brokers, purchasing houses, etc. of the products. Vendors may be the clients of service center 102 or entities having a business relationship with service center 102. A user (also referred to herein as a customer) can activate application 103 from the user's mobile device 101 to reach agents 105 the service center 102 or KB data center 114 via a variety of communication channels or media, such as, for example, email, chat, voice (including automated interactive voice recognition or IVR, voice over Internet protocol or VoIP), video, Web, and/or online community-based forum, etc. Application 103 can be a thin/thick client application or a Web-based application.

Note that a service center described throughout this application is not limited to a traditional service center or call center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the service center, without a need of a real person involved. Such processing logic and/or functional blocks can be implemented in software, hardware, or a combination thereof. Further detailed information concerning service center 102 can be found in co-pending U.S. patent application Ser. No. 13/085,397, filed Apr. 12, 2011, which is incorporated by reference in its entirety.

Figure 2:
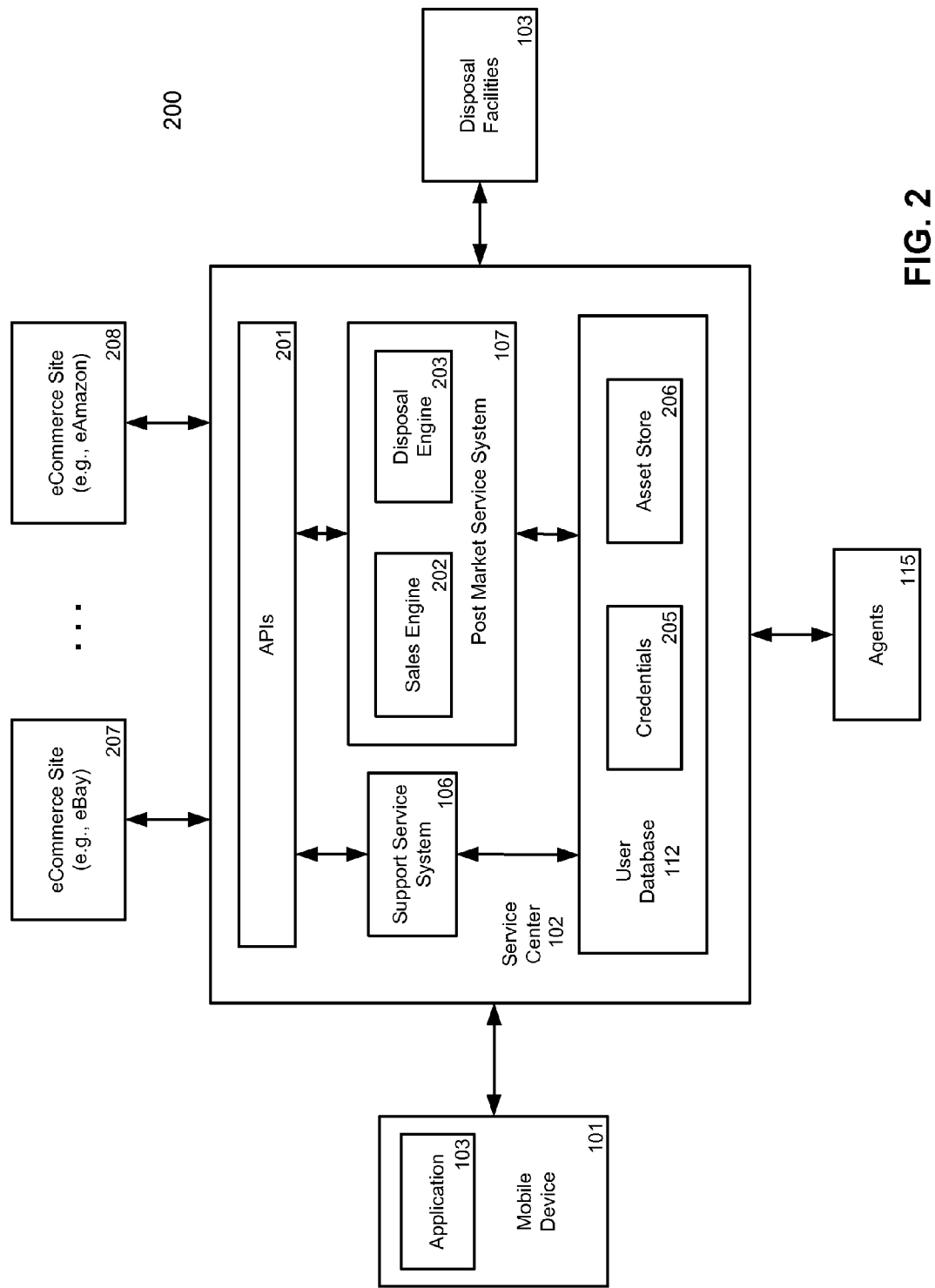
FIG. 2 is a block diagram illustrating an example of a service center according to another embodiment of the invention.

FIG. 2 is a block diagram illustrating an example of a service center according to another embodiment of the invention. For example, system 200 may be implemented as part of system 100 of FIG. 1. Referring to FIG. 2, as described above service 102 includes support service system 106 and post market service system 107. Support service system 106 is configured to communicate with a user of mobile device via application 103. Through a service API or APIs, a user can register a product with service center 102 by scanning a machine-readable code such as a barcode, a universal product code (UPC), or a serial number of the product, for example, using a scanner or camera of mobile device and transmitting the machine-readable code to service center 102 over a network.

Based on the machine-readable code, a registration module of support service system 106 is configured to compile any information concerning the product without requiring the user to provide the same detailed information of the product. For example, the registration module is configured to access a variety of informational sources such as client backend systems 118 and manufacturer backend systems 119 of FIG. 1 to obtain the detailed information based on the machine-readable code, without requiring a user to provide the same detailed information. Further detailed information concerning registration of a product can be found in the above incorporated-by-reference co-pending application. The information of the registered product or products may be stored in asset store 206 of user database 112.

In addition, according to one embodiment, a user can also register eCommerce sites 207-208 with the service center 102. For example, a user can provide necessary credentials that are required to access eCommerce sites 207-208 and the credentials are stored in user database 112 as part of credentials 205. Examples of credentials 205 include usernames and/or passwords of the user to access eCommerce sites 207-208. Credentials 205 can be subsequently used for accessing eCommerce sites 207-208 without prompting the user for the same.

As described above, support service system 106 is configured to provide support services to a user regarding a registered product stored in asset store 206. For example, in response to a request for support services of a registered product received from application 103 of mobile device 101, support service system 106 is configured to establish a communications session between a user of mobile device 101 and one of agents 115 using one or more communications channels (e.g., voice, email, chat, video, etc.) that are preferred by the user and are available to the agent. The preference of the communications channels may be previously configured or registered with service center 102 by the user and such preferences may also be stored in a preference store (note shown) of user database 112.

According to one embodiment, post market system 107 includes a sales engine 202 and disposal engine 203. Sales engine 202 is responsible for selling a registered product from asset store 206 on at least one of eCommerce sites 207-208. In one embodiment, a user can utilize application 103 of mobile device to send a request to service center 102 for selling a registered product. The request may simply identify a registered product with a listing price and one or more identifiers identifying one or more of eCommerce sites 207-208 for selling the product, without having to provide other detailed information such as detailed product information and necessary credentials for accessing the social community sites 207-208.

In response to the request, sales engine 202 is configured to retrieve the necessary credentials 205 required to access eCommerce sites 207-208 and the necessary product information (e.g., description or specification, etc.) from the product database (e.g., product database 110) and/or client database (e.g., client database 111). Sales engine 202 then transmits the product information, listing price, and the associated credentials to the specified eCommerce sites 207-208 via API 201. API 201 may include specific APIs for accessing different eCommerce sites using a variety of communications protocols.

The eCommerce sites 207-208 can authenticate the user based on the received credentials without requiring service center 102 to prompt the user for the same credentials at the time of submitting the sales. Upon having successfully authenticated the user, the sales of the product may be posted on the eCommerce sites 207-208 based on the received product information and the listing price. In one embodiment, a single request from mobile device 101 can be used to post a sales item on multiple eCommerce sites 207-208 without having the user to submit the sales item multiple times. Sales engine 202 is configured to coordinate the sales transactions among eCommerce sites 207-208, for example, to prevent the same item to be sold on multiple sites, etc. For example, when an item has been sold on a first site, the listing of the same item will be withdrawn from a second site.

In one embodiment, service center 102 can also perform or invoke another entity to perform market survey concerning current market conditions of a product, for example, based on operating conditions of the product at the point in time, which may be provided by a user. Based on the survey, service center 102 can provide an estimated market value of a registered product and transmit the estimated value to mobile device 101 and displayed by application 103. The estimated market value of the product can help the user to set a selling price.

According to another embodiment, service center 102 can also promote or suggest other products (e.g., accessories) related to the registered products to the user and provide a purchasing platform to allow a user to purchase the related products. The purchasing functionality may be implemented as part of sales engine 202 or a separate component. Once a product is purchased via service center 102, the purchased product is automatically registered within service center 102 without the user to specifically register the product, for example, based on the product information and/or client information obtained from manufacturer and/or client back-end systems.

Note that a manufacturer or retailer often wishes to promote or reward a customer who purchased its product or subscribed its loyalty program. Alternatively, a manufacturer or retailer may also notify a user concerning a recall of user's products. Such a promotion, reward, or notice may be received by service center 102 from a variety of sources such as manufacturers and retailers. Service center 102 can associate such a promotion or reward with a registered product and transmit such a promotion or reward to mobile device 101 as a suggestion to the user. As a result, service center 102 enables the manufacturers or retailers to reach their customers, similar to targeted advertisement. Meanwhile, a user does not have to browse around in order to find out any product upgrades or product recall associated its registered products. The user can simply rely on service center 102 for such services.

According to another embodiment, disposal engine 203 is configured to arrange disposal facilities 209 to dispose a registered product if the user no longer wishes to maintain the product. In this situation, a user does not have to individually find out who can dispose or recycle a particular type of products. Instead, the user can initiate a request from mobile device 101 requesting disposal of a registered product. In response to the request, disposal engine 203 is configured to determine a particular one of disposal facilities 209 that is capable of disposing or recycling the requested product and to transmit the information of the selected one of disposal facilities 209 to allow the user to contact the selected disposal facility or alternatively, disposal engine 203 can establish a communications sessions between the user and a customer representative from the selected disposal facility, for example, using a communications channel preferred by the user and available to the customer representative. Thus, service center 102 is able to provide a single platform capable of providing product registration, support, buying and selling, and disposal, i.e., a full life cycle support of a product.

Figure 3:
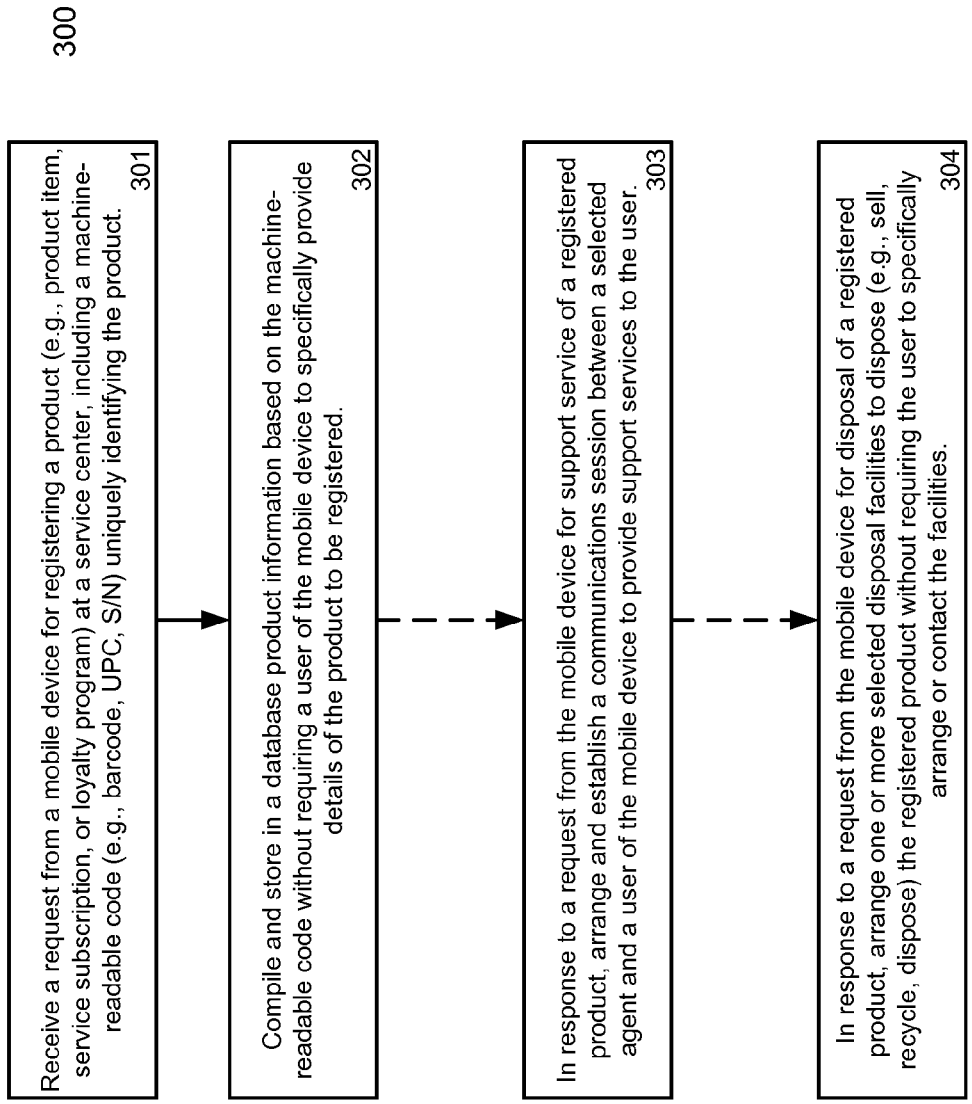
FIG. 3 is a flow diagram illustrating a method for providing life cycle services of a product according to one embodiment of the invention.

FIG. 3 is a flow diagram illustrating a method for providing life cycle services of a product according to one embodiment of the invention. Method 300 may be performed by service center 102 of FIG. 2. Referring to FIG. 3, at block 301, a request for registering a product is received at a service center from a mobile device over a network. The product may represent an actual product item or a service such as a loyalty program. The request includes a machine-readable code uniquely identifying the product to be registered. The machine-readable code may be obtained by scanning the machine-readable code from the product (e.g., surface of the product or loyalty membership card) using a scanner or camera of the mobile device. At block 302, in response to the request, product information is compiled based on the machine-readable code without requiring the user to specifically provide the same and product information is stored in a database (e.g., asset store of a user database).

Subsequently, at block 303, in response to a request received from the mobile device for support services of a registered product, a communications session is established between the user and an agent, using one or more communications channels preferred by the user and available to the agent to enable the agent to provide the support services. Later on, at block 304, in response to a request received from the mobile device for disposal of a registered product, processing logic arranges one or more selected disposal vendors to dispose the product without having the user to specifically search and contact the disposal vendors.

Figure 4B:
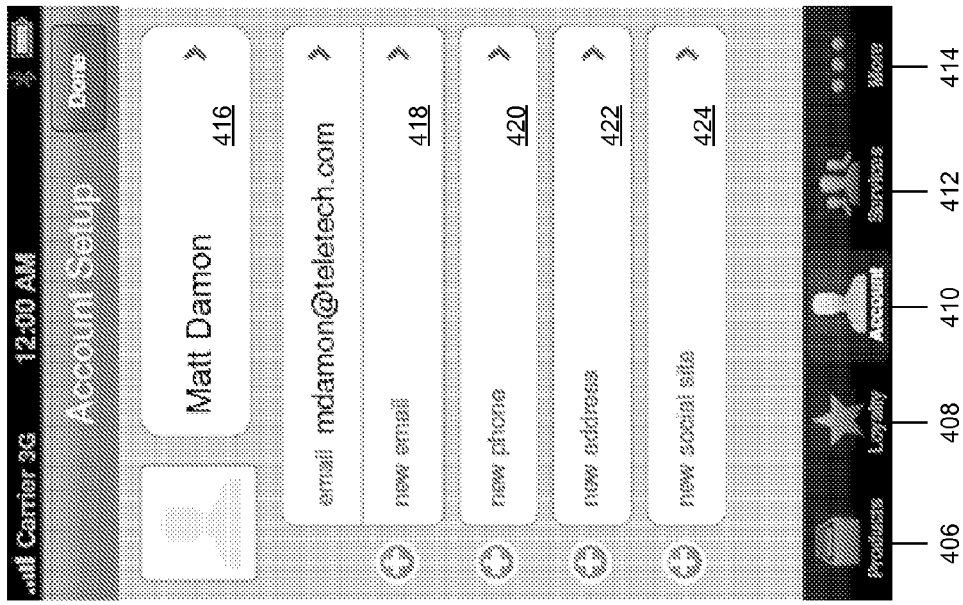
FIGS. 4A-4D are screenshots representing examples of graphical user interfaces of an application according to one embodiment of the invention.
Figure 4A:
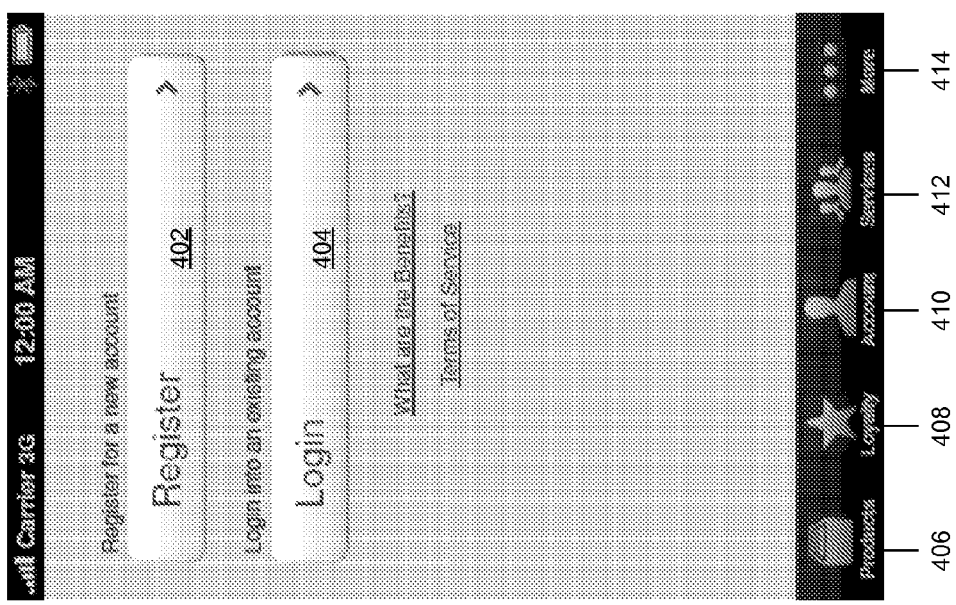

FIGS. 4A-4D are screenshots representing examples of graphical user interfaces of an application according to one embodiment of the invention. For example, the GUIs as shown in FIGS. 4A-4D may be implemented as part of application 103 installed on mobile device 101 of FIG. 1. Referring to FIGS. 4A-4D, the GUI as shown in FIG. 4A is displayed when a user launches the application from its mobile device. The application as shown in FIG. 4A includes multiple pages 406-414, each of which can be activated and displayed by activating (e.g., clicking, tapping, or via a voice interactive command) the corresponding graphical representation (e.g., icon). Before a user can access any one of the pages 406-414, the user has to either create a user account or log into an existing user account of the support center.

Figure 4D:
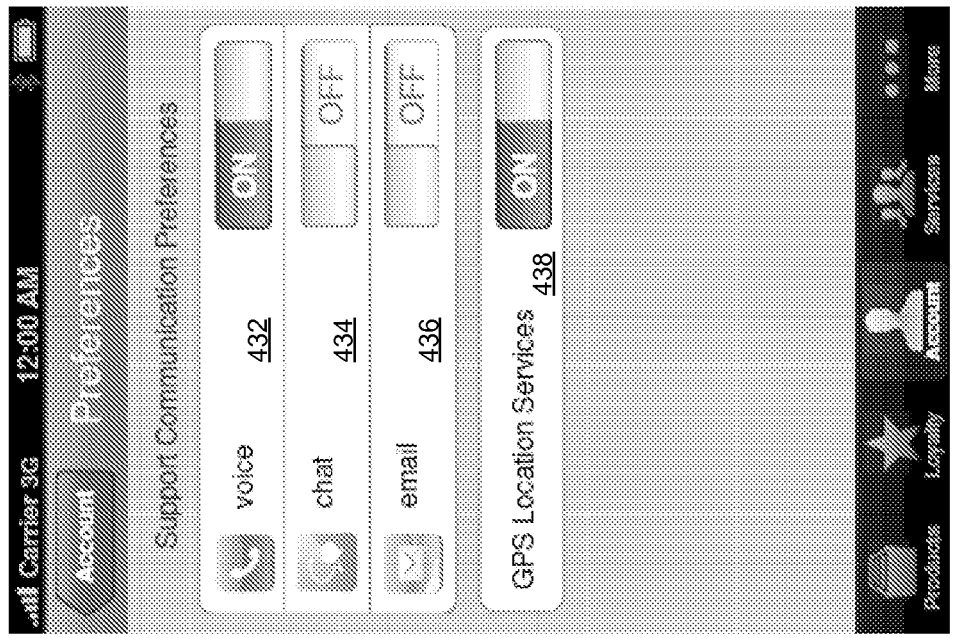
Figure 4C:
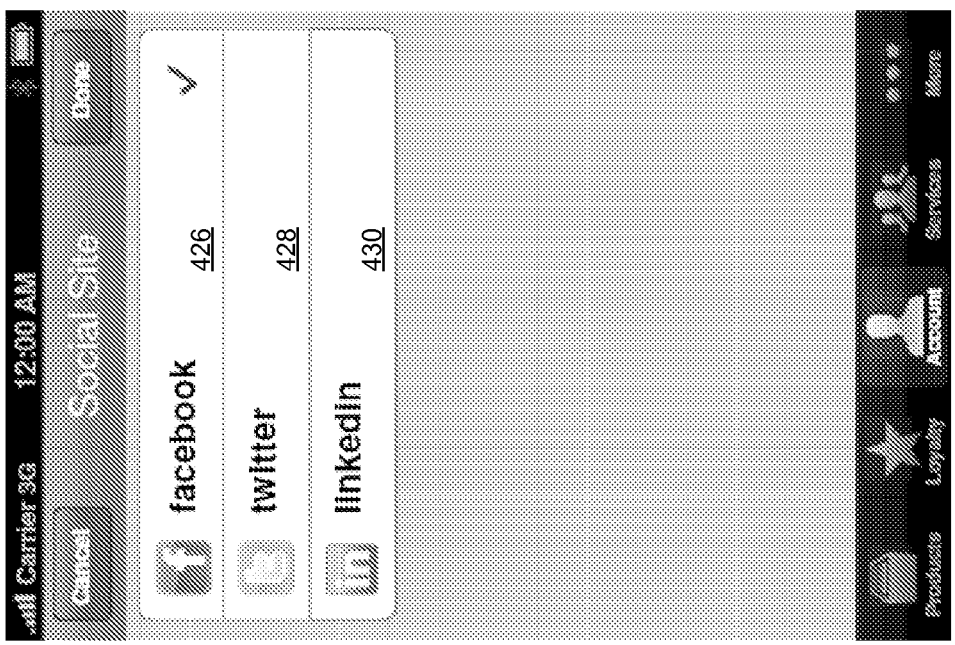

As described above, when the application is launched, the application is configured to communicate with the service center (e.g., service center 102 of FIG. 2) via a set of APIs. A user can log in and access its existing account via button 404, which in turn access the existing account at the support center. If the user does not have an existing account, the user can also create a new account via button 402. When button 402 is activated, the GUI page as shown in FIG. 4B is displayed, which is a part of account page 410. In one embodiment, the GUI page as shown in FIG. 4B allows the user to enter any user specific information, such as, for example, name 416, email address(es) 418, phone number(s) 420, address(es) 422, social site(s) 424, and other information such as preferences (not shown), etc. For example, a user can activate social site 424 to specify one or more social community sites in which the user has an account, such as social community sites 426-430 as shown in FIG. 4C. By specifying social sites 426-430, the user gives a consent or permission to the system to access its information via the corresponding social sites (not limited to shown) 426-430.

In one embodiment, a user can also specify support communication preferences by activating the corresponding preference item (not shown) from the list displayed on the GUI page as shown in FIG. 4B. A preference setting page as shown in FIG. 4D allows a user to specify one or more communication channels, such as voice 432, chat 434, email 436, and other channels (e.g., video chat, SMS, scheduled call back, etc.). Such communication preferences of the user can be used in combination of communication preferences of a client to determine availability of communication channels to allow the user to reach an agent of the support center during a subsequent support service as described above. The user can also specify, via setting 438, whether the system can utilize global positioning system (GPS) location services to provide geographical location information of the user (e.g., presence information) as part of support services provided to the user. By enabling GPS location services 438, the user gives consent or permission to the system for such a usage for the purpose of privacy concerns.

Figure 5B:
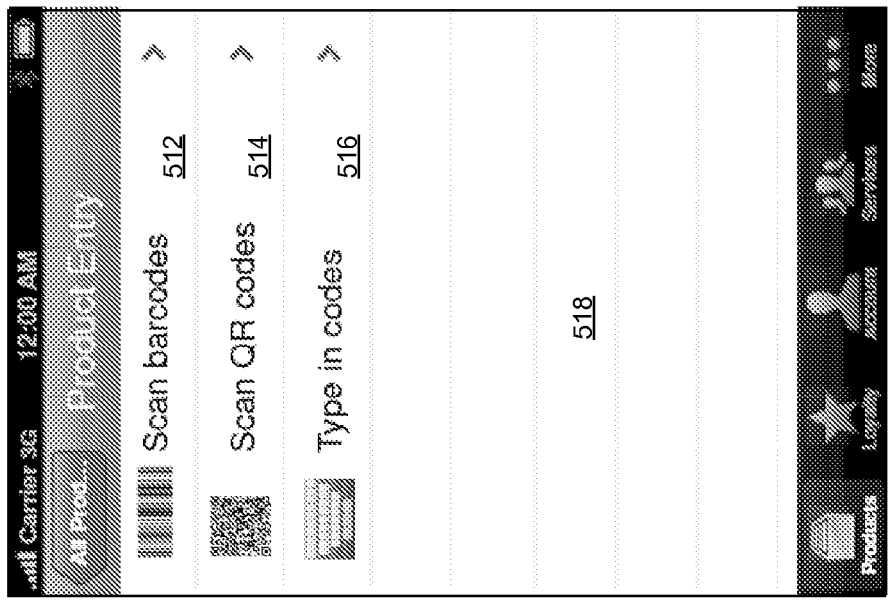
FIGS. 5A-5F are screenshots representing examples of graphical user interfaces of an application according to another embodiment of the invention.
Figure 5A:
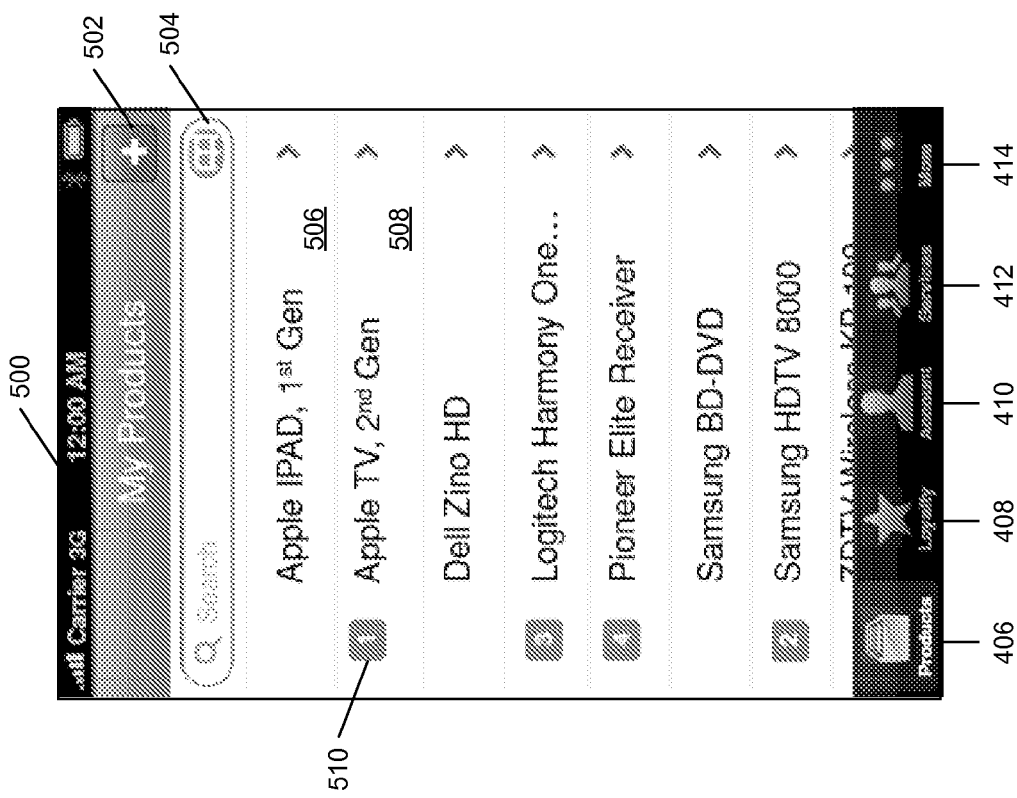

FIGS. 5A-5F are screenshots representing examples of graphical user interfaces of an application according to another embodiment of the invention. For example, GUI page 500 of FIGS. 5A-5F can be displayed by activating products tab 406 from GUI pages of FIGS. 4A-4D. Referring to FIGS. 5A-5F, GUI 500 is displayed including a list of one or more products, such as products 506 and 508, which are owned and have been registered by the user. GUI page 500 further includes search tool 504 to allow a user to search a particular registered product. From the list of registered products as shown in FIG. 5A, if a particular product has an event or notification pending, a number representing number of events or notifications is also displayed within proximity of the corresponding product. For example, number 510 indicates that there is at least one pending event or notification of product 508.

In one embodiment, GUI page 500 further includes button 502 to register an additional product. When button 502 is activated, GUI page 518 is displayed as shown in FIG. 5B. GUI page 518 allows a user to register a product via variety of current mechanisms as well as future mechanisms as they are technically made available. A user can register a product by scanning a barcode or barcodes of a product via link 512 or scanning a QR code or codes of a product via link 514. Alternatively, a user can manually enter product information via link 516.

For the purpose of illustration, it is assumed that the user wishes to register a product by scanning a barcode via link 512. According to one embodiment, when link 512 is activated, GUI page 520 is displayed as shown in FIG. 5C. Referring to FIG. 5C, in this embodiment, a user can scan a barcode using GUI page 520 to register a product. The user can place barcode 528 of the product within scanning window 526 to obtain product ID 522 and/or serial number 524 of the product. The scanned information is then transmitted from the mobile device to the support center to allow the system to compile the necessary information about the product and/or user. As described above, the system can communicate with all the parties (e.g., retailer, manufacturer, etc.) via proper service APIs to automatically obtain information such as product information, loyalty information, or the like, without user intervention. For certain information that cannot be obtained automatically, the user can manually enter the information. The detailed information can then be stored in a customer asset store (e.g., asset store 206 of FIG. 2).

Figure 5D:
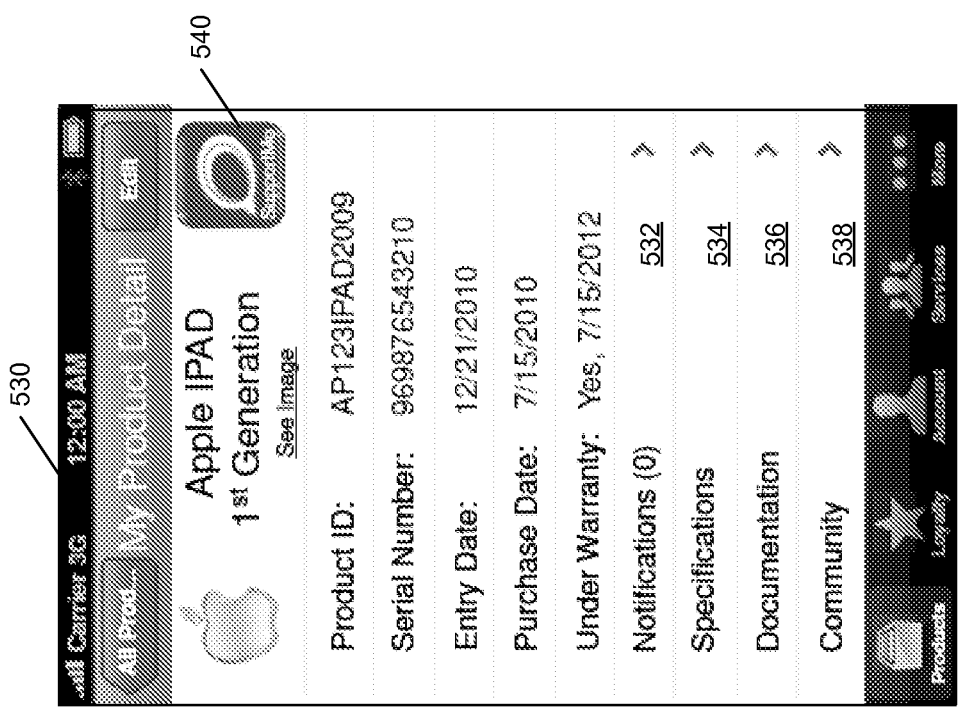
Figure 5C:
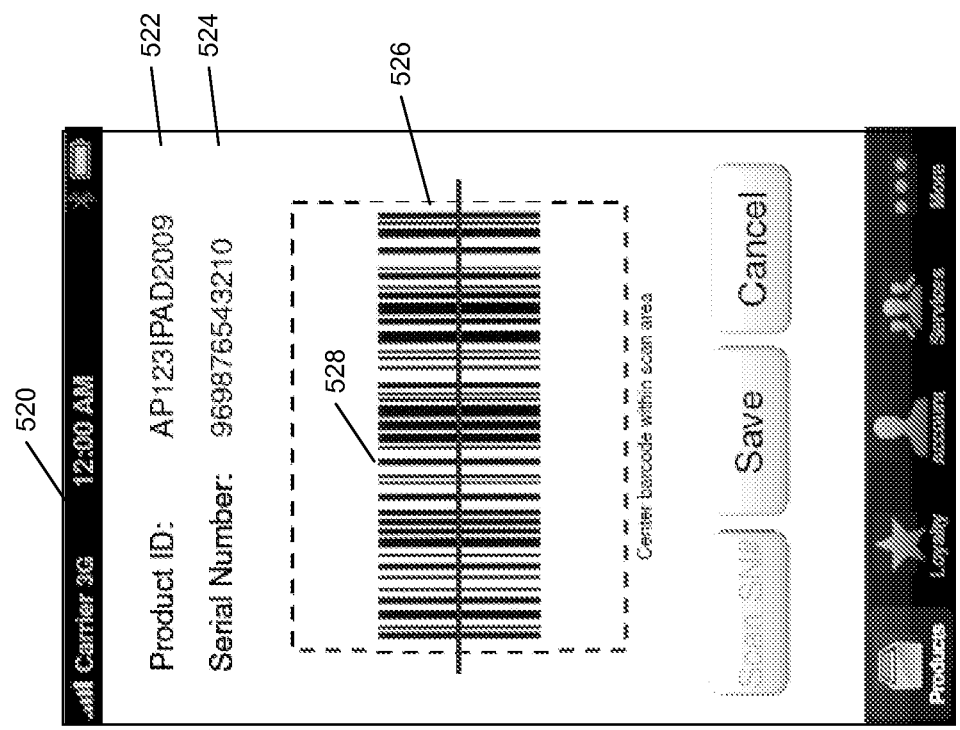

In one embodiment, the product detailed information can be retrieved from the support center and displayed on the mobile device as part of GUI page 530 as shown in FIG. 5D. Referring to FIG. 5D, the displayed product detailed information includes (but not limited to) the product ID, serial number, purchase date, and warranty information, etc. In addition, GUI page 530 further includes one or more links 532-538 to allow a user to access other information associated with the corresponding product. In one embodiment, link 532 allows a user to access a notification issued on the product, such as an offer to upgrade or discount, a recall notification, etc. Link 534 allows a user to access the detailed specification of the product. Link 536 allows a user to access documents such as user manuals of the product. Link 538 allows a user to access an online community (e.g., discussion forum) associated with the product or mechanisms to post to a community directly. Note that GUI page 530 can also be accessed or displayed by selecting one of the registered products (e.g., product 506) from GUI page 500 of FIG. 5A.

Figure 5F:
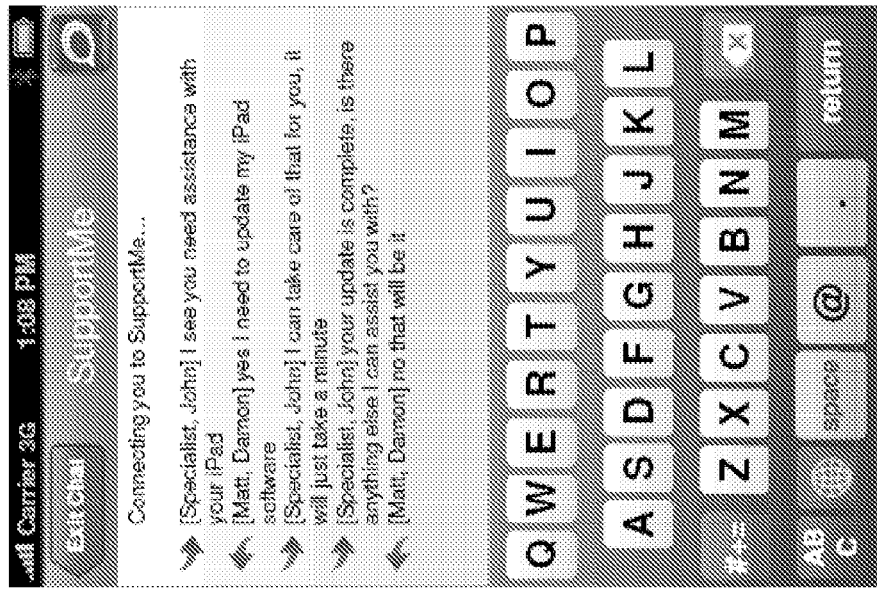
Figure 5E:
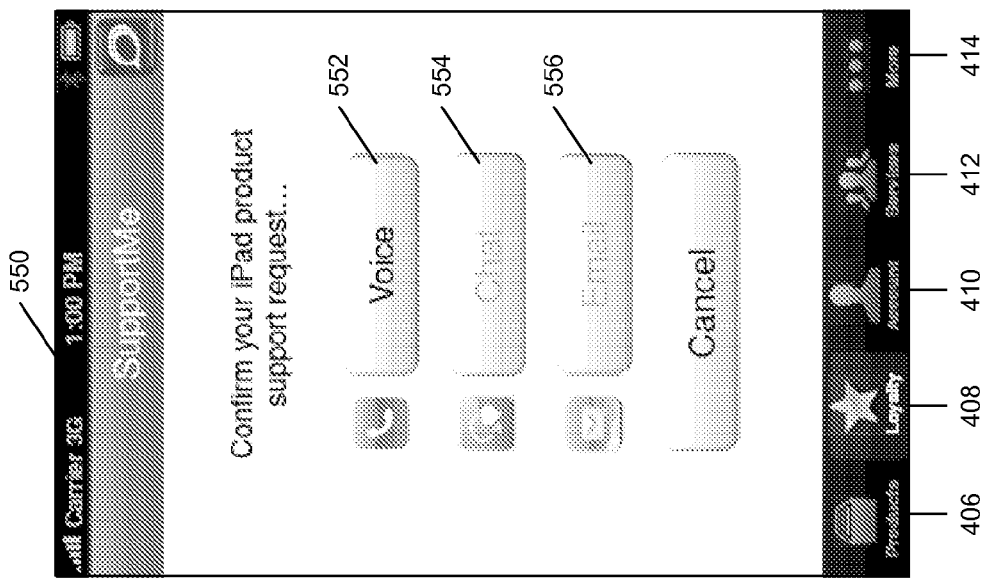

According to one embodiment, GUI page 530 further includes button 540 to allow a user to obtain support services from the support center. When button 540 is activated from GUI page 530 of FIG. 5D, a GUI page similar to GUI page 550 is displayed as shown in FIG. 5E, where GUI page 550 can be used to obtain support services for registered products and/or loyalty programs. Within GUI page 550, according to one embodiment, a list of one or more communication channels or mechanisms that are available to a user to contact a support agent is displayed. In this example, the available communication channels include voice 552, while chat 554 and email 556 are unavailable. As described above, the availability of the communication channels is determined based on user's preferences and client's preferences. Note that for purposes of illustration only, voice, chat, and email are utilized examples of communication channels; other communication channels such as video chat, SMS, call back, etc., can also be utilized. Assuming that chat 554 is available in this example, a user can launch a chat session with an agent of the support center to obtain support services as shown in FIG. 5F. Since the user launched support from within the product (in this example product 506, iPad of GUI page 500), user and product specific data is sent as a part of the request for service to allow a support specialist to understand the context of the interaction.

Figure 6B:
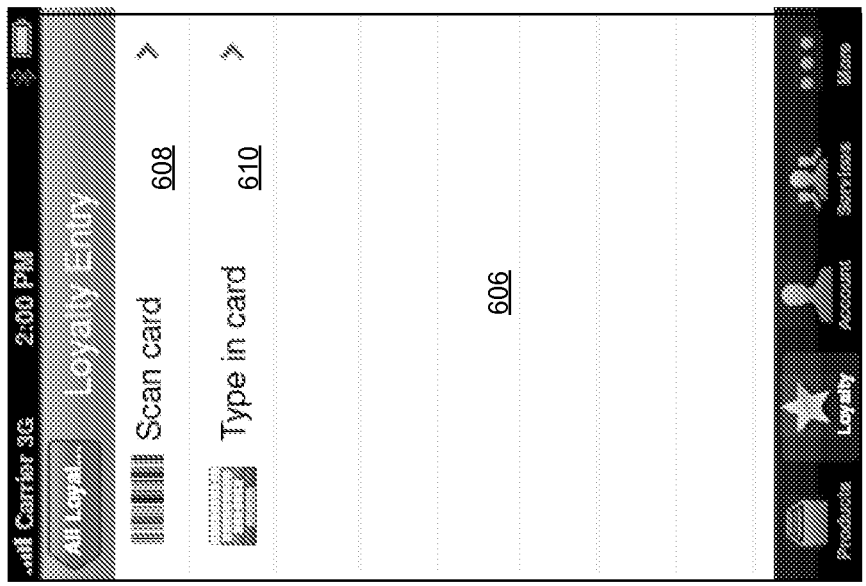
FIGS. 6A-6D are screenshots representing examples of graphical user interfaces of an application according to another embodiment of the invention.
Figure 6A:
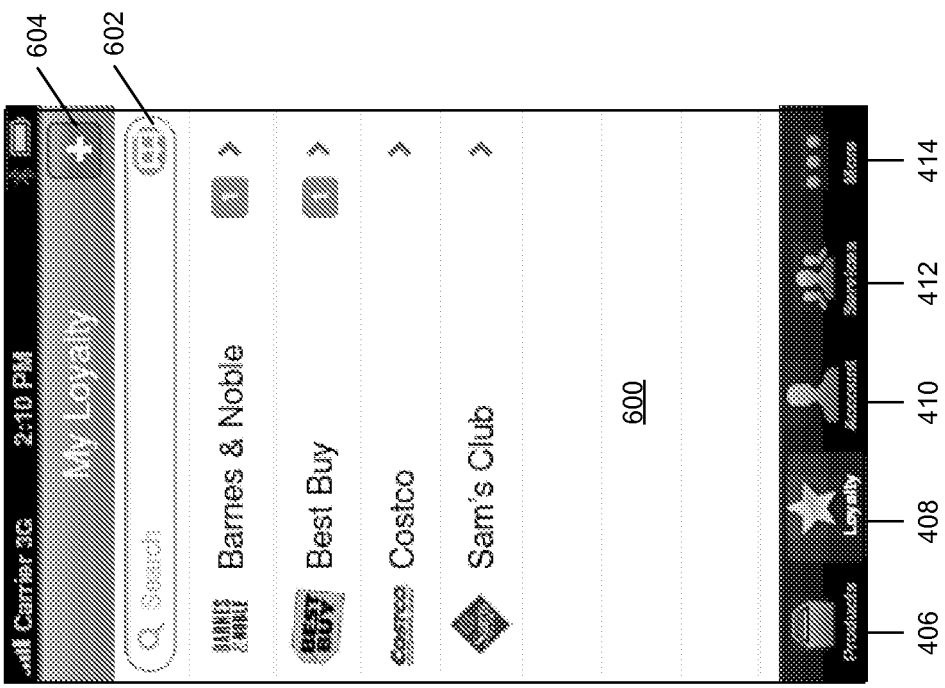
Figure 6D:
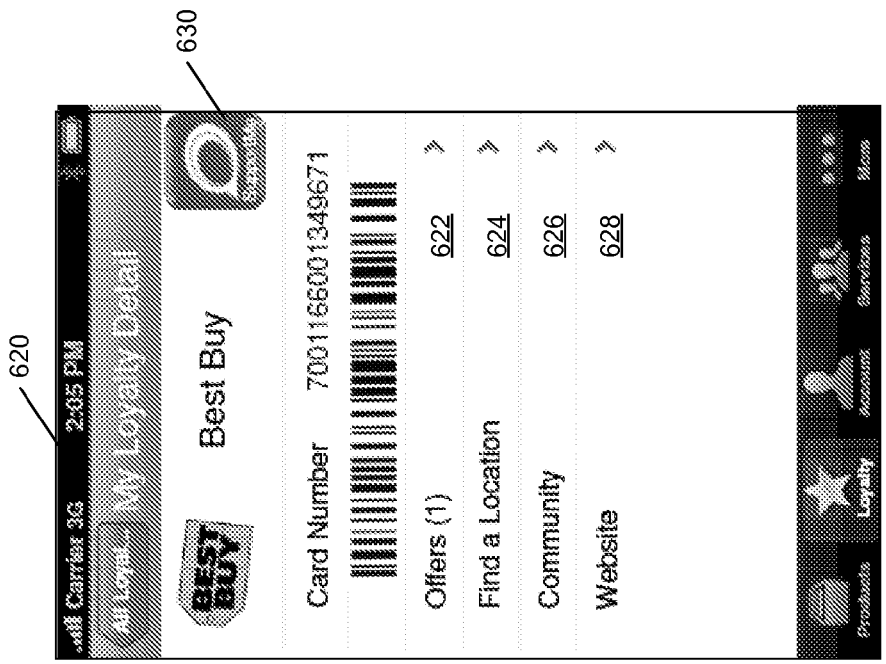
Figure 6C:
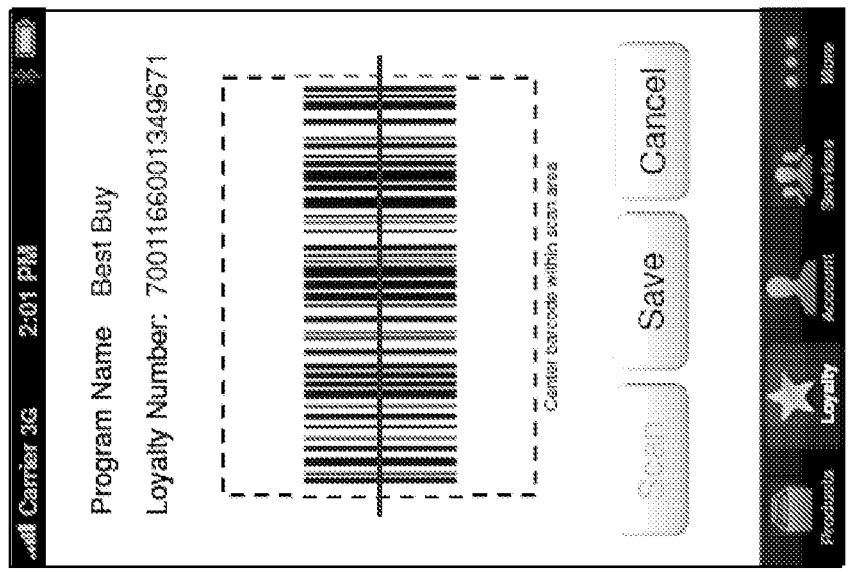

Similar to the product registration, according to one embodiment, a loyalty or reward card of a client (e.g., retailer) can also be registered with the support center via the application running within a mobile device. FIGS. 6A-6D are screenshots representing examples of graphical user interfaces of an application according to another embodiment of the invention. For example, GUI page 600 of FIG. 6A can be retrieved and displayed by activating loyalty tab 408 from other GUI pages, which lists a list of registered loyalty programs of the user. Referring to FIGS. 6A-6D, a user can also search a registered loyalty program using search tool 602. A user can also register an additional loyalty program by activating button 604, which displays GUI page 606 as shown in FIG. 6B. From GUI page 606, the user can register a loyalty program by either scanning, using a scanner or camera of a mobile device, a barcode of a loyalty card via link 608 or manually entering the information via link 610. If the user wishes to register via scanning, the user can activate link 608, which displays the GUI page as shown in FIG. 6C. Similar to scanning barcodes of a product, from the GUI page of FIG. 6C, a user can register a loyalty program by scanning a barcode of a loyalty card or reward card.

Based on the information obtain from the scanning or from the user, detailed loyalty information can be obtained by the support center from proper informal sources via proper APIs. The detailed information can also be retrieved from the system and displayed as GUI page 620 on the mobile device as shown in FIG. 6D. Referring to FIG. 6D, from GUI page 620, a user can access one or more offers (e.g., rewards, discounts, upgrades, etc.) from the program via link 622. The user can also find a nearby office via link 624; access an online community associated with the program via link 626; and access the program's Web site via link 628. If the user needs to talk to a live agent concerning the corresponding loyalty program, the user can activate support button 630, which brings the user to a support GUI page similar those as shown in FIGS. 5E and 5F.

Figure 7B:
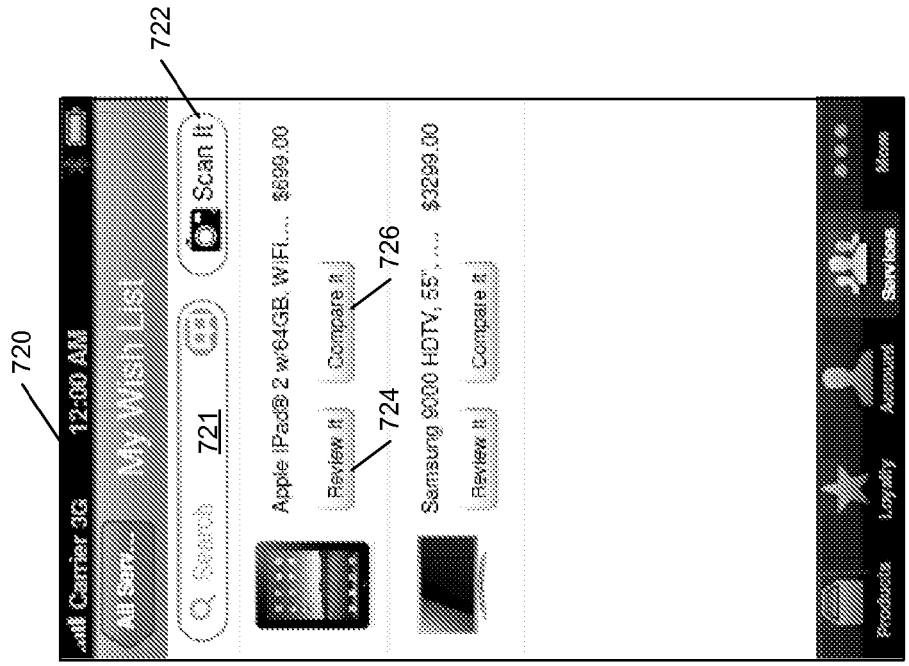
FIGS. 7A-7Q are screenshots representing examples of graphical user interfaces of an application according to another embodiment of the invention.
Figure 7A:
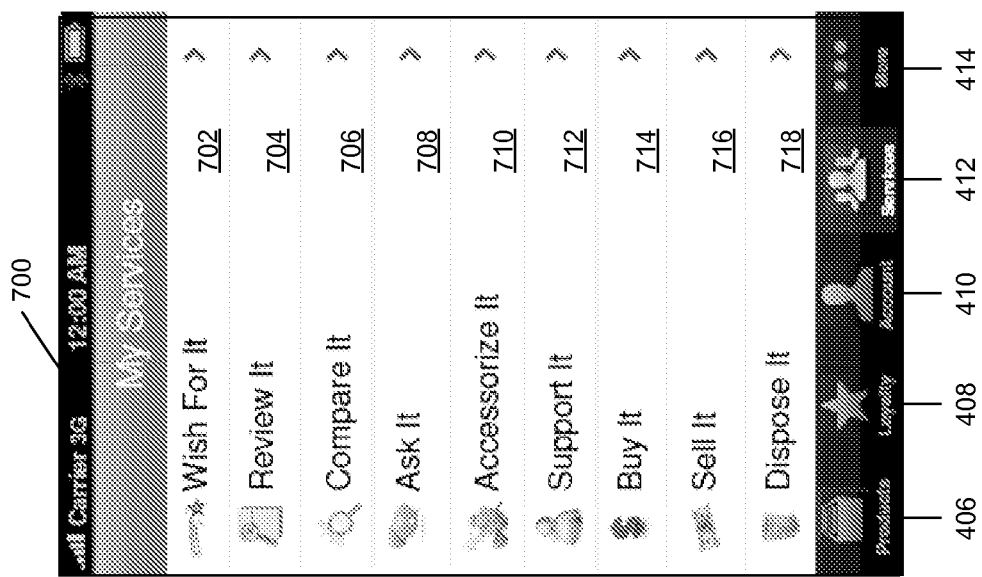

FIGS. 7A-7N are screenshots representing examples of graphical user interfaces of an application according to another embodiment of the invention. For example, GUI page 700 of FIG. 7A can be displayed by activating services tab 412. Referring to FIGS. 7A-7N, GUI page 700 of FIG. 7A includes (but not limited to) displayed therein a list of services 702-718 that can be provided to the user by the support center. In one embodiment, a user can compile a list of items the user wishes to have by activating link 702, which displays GUI 720 as shown in FIG. 7B.

Figure 7D:
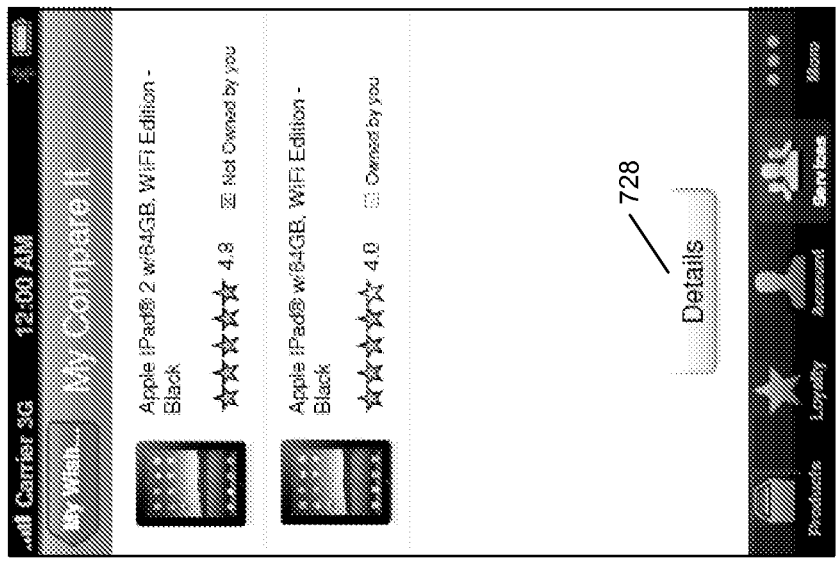
Figure 7C:
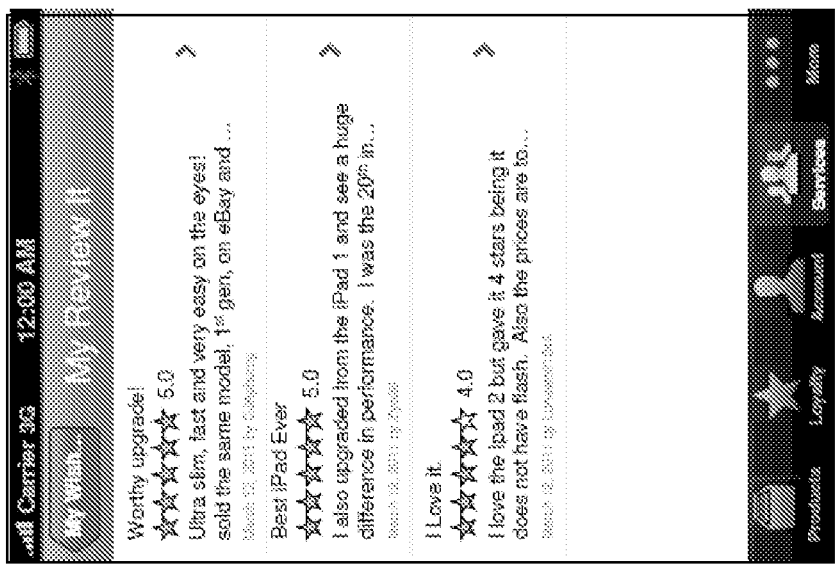

Referring to FIG. 7B, from GUI page 720, a user can search for an item that is interesting to the user using search tool 721. For example, a user can search on the Internet for an item the user wishes for. Alternatively, the user can scan using scanning tool 722 a barcode or QR code of the wished product. This is useful when a user is shopping in a retail store in that the user can scan, using a scanner or camera of a mobile device, the barcode of the product in order to add the product into its wish list. In one embodiment, for each of the items listed in the wish list, the user can review other people's comments about the product by activating button 724, which brings a list of comments from other users as shown in FIG. 7C. In addition, the user can also compare the product with another one by activating button 726, which displays comparison GUI page as shown in FIG. 7D. From the GUI page of FIG. 7D, each of the products listed also includes information indicating whether the corresponding product is currently owned by the user. Further, the user can display detailed comparison information (e.g., side-by-side information) by activating button 728. Note that the GUI page as shown in FIG. 7C can also be displayed via link 704 of FIG. 7A and the GUI page as shown in FIG. 7D can also be displayed via link 706 of FIG. 7A.

Figure 7F:
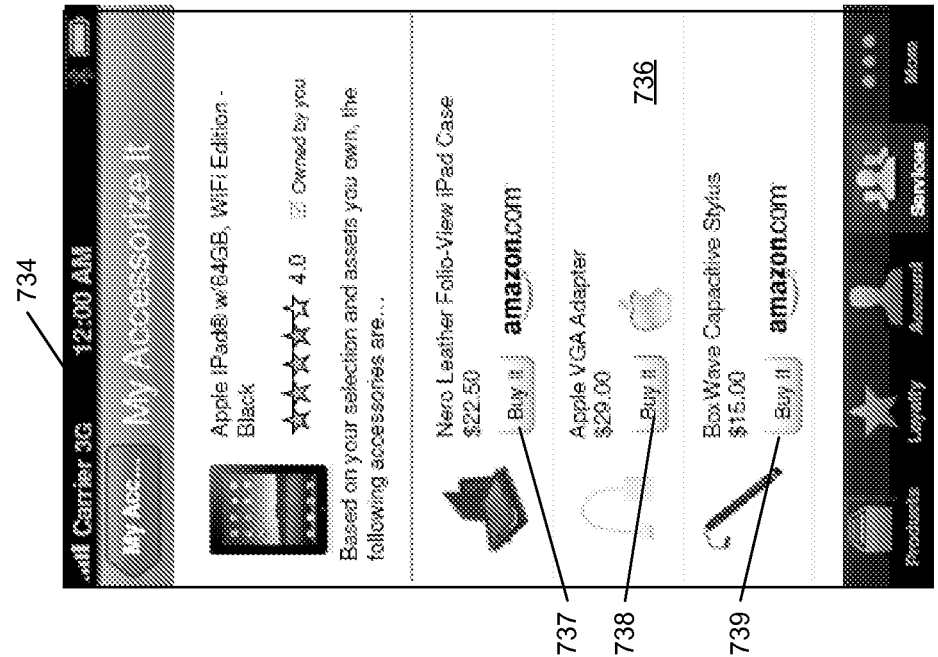
Figure 7E:
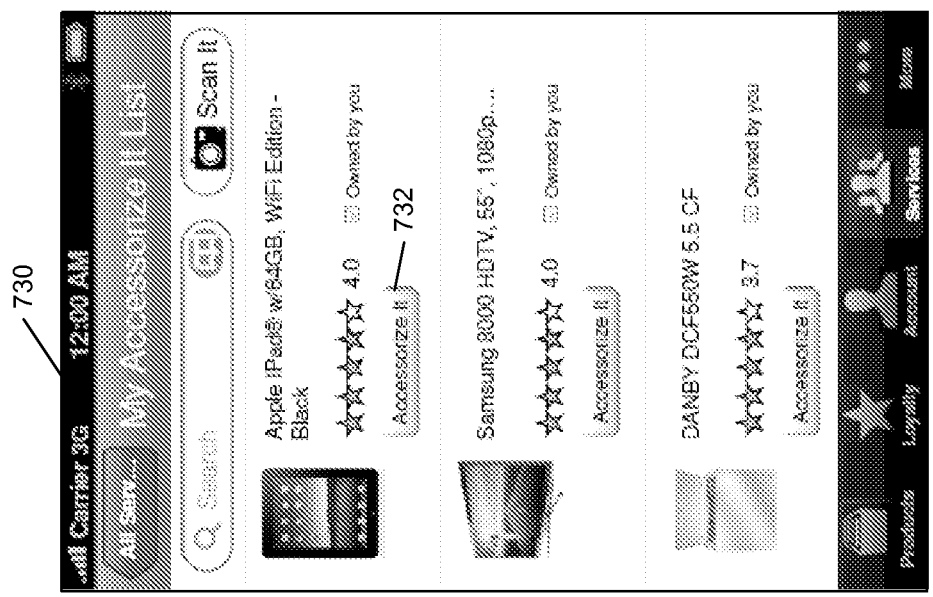

Referring now to FIGS. 7E and 7F, a user can also obtain support services from the support center via link 712 of FIG. 7A. To obtain information about accessories associated with a particular product in one embodiment, GUI page 730 can be displayed via link 710 of FIG. 7A. GUI page 730 includes a list of products that have been registered. Each of the listed products includes a button to accessorize the corresponding product such as button 732. When the button, in this example, button 732, is activated, GUI page 734 is displayed. In one embodiment, GUI page 734 includes a list of accessories 736 including retailers from which the accessories can be purchased (e.g., via buttons 737-739 or via link 714 of FIG. 7A). All of the information is obtained and provided by the support center, where the support center communicates with each of the retailers via a proper API to obtain the detailed information as described above, without requiring user's manual efforts. The items presented are recommended accessories based on a variety of factors or considerations such as, for example, the most purchased product accessories by users with the same or similar registered product, as well as the users' recent interactions or behaviors with the service center.

Figure 7H:
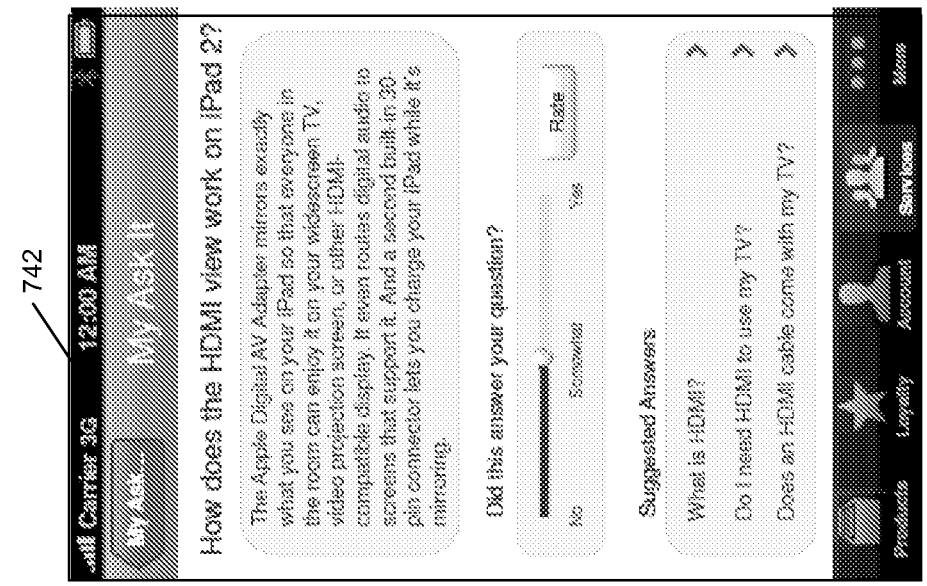
Figure 7G:
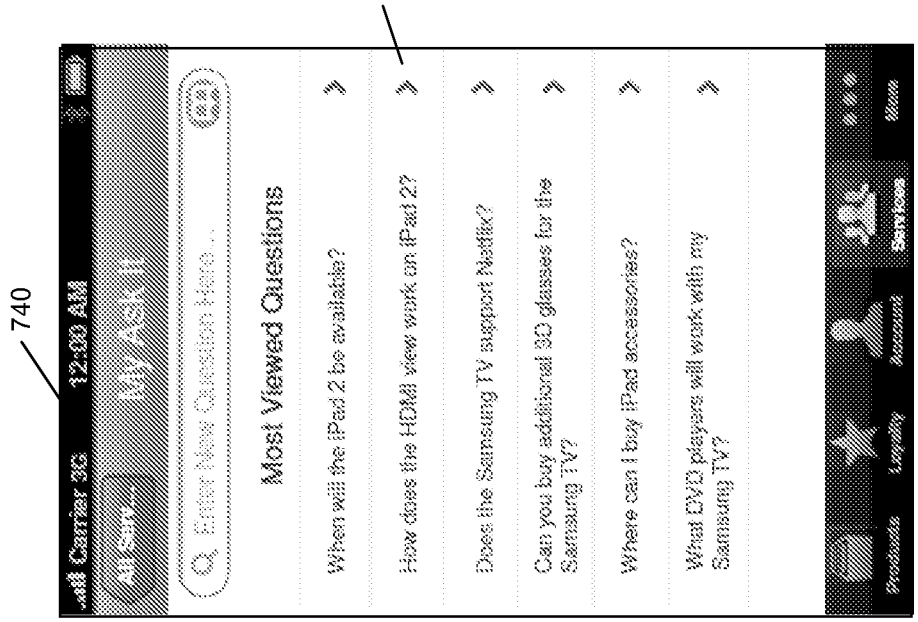

According to one embodiment, a user can also access self-support knowledge such as most asked questions via link 708 of FIG. 7A. When link 708 is activated, GUI page 740 of FIG. 7G is displayed. GUI page 740 includes a list of answers to most viewed questions asked by other users on the same or similar product. The information may be compiled by the support center based on data collected from a variety of informational sources as described above or built dynamically based on some or all users use of the knowledge. The list of articles displayed may also be compiled based on user's profile such as registered products and/or historical interaction or purchases. Detailed answers to each of questions such as question 744 can be displayed (in this example as GUI page 742) via the corresponding link as shown in FIG. 7H. Referring to FIG. 7H, an article including a detailed answer is displayed on the GUI page. In addition, the user can rate the article, which contributes to the overall rating of the article. Further, based on the article, the system also compiles and provides a list of suggested articles that may be related to the currently displayed article or is the next typical article other users have reviewed in conjunction with the first.

Figure 7L:
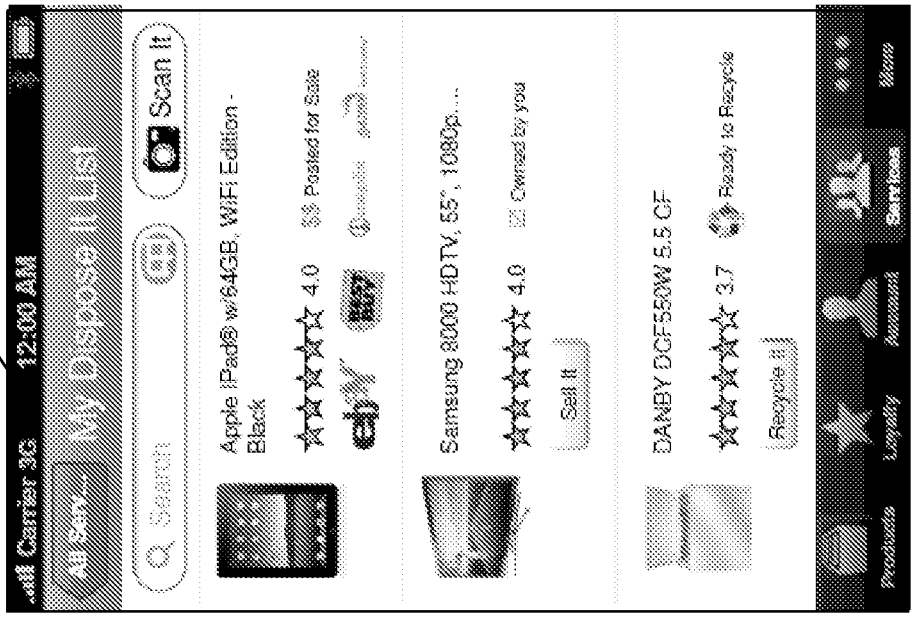
Figure 7K:
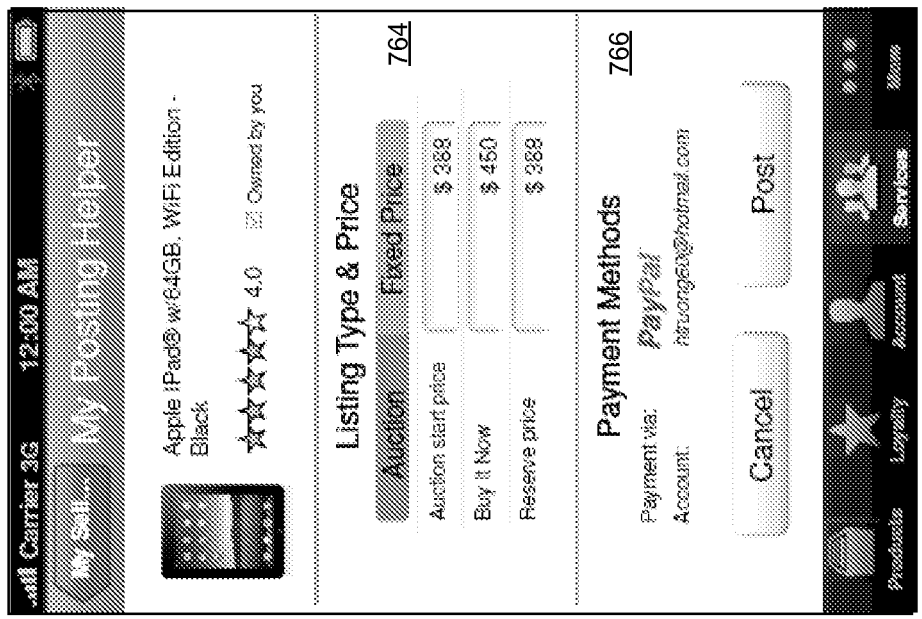
Figures 7M, 7N:
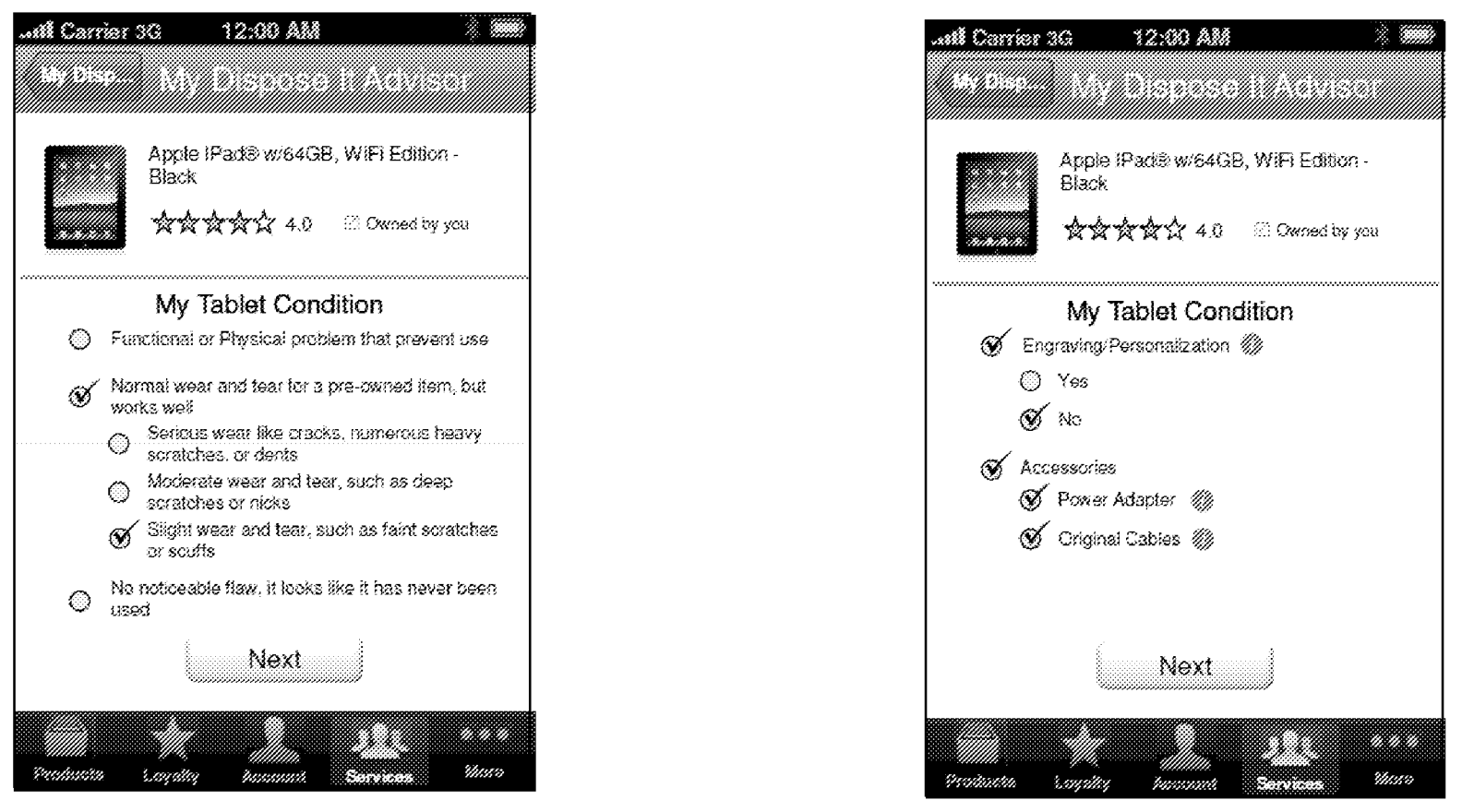
Figure 70:
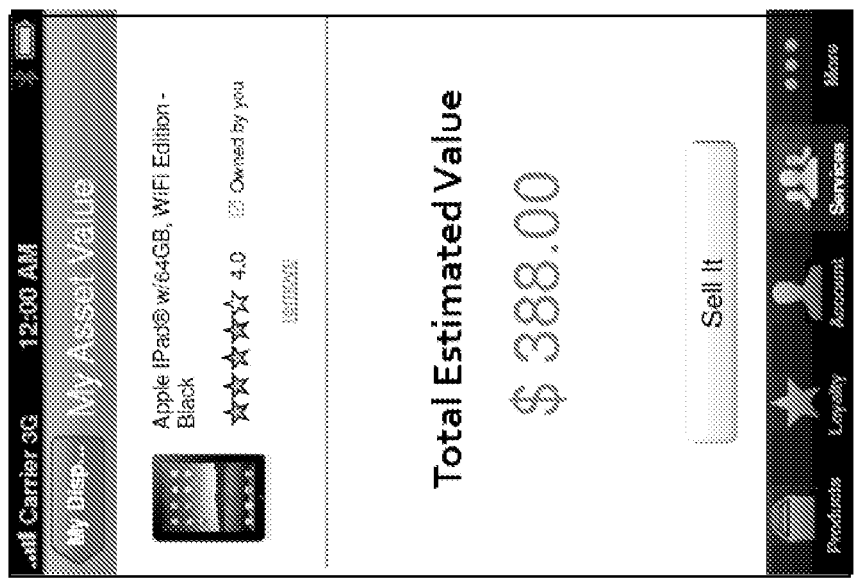

According to one embodiment, for each of the registered products, the support center can also provide services to a user to sell the product at a variety of ecommerce platforms. In one embodiment, a user can activate link 716 to arrange selling one or more of its registered products. When link 716 is activated, selling GUI page 750 is displayed as shown in FIG. 7I. GUI page 750 lists all the products that have been registered with the support center. A user can sell any one of them by activating a sell button of the corresponding product. For example, a user can sell product 752 by activating sell button 754, which displays GUI page 760 as a posting helper. From GUI page 760, the user can specify one or more selling platforms or venues to sell the corresponding product. The user can also specify the selling or auction price 764 and payment method 766 as shown in FIG. 7K.

Payment method 766 may be a variety of payment methods provided by a variety of payment processing providers, such as PayPal™ from eBay® or Checkout™ from Google®, etc. Similarly, according to one embodiment, the necessary credentials for accessing the corresponding payment processing providers may be previously registered with the service center and stored in a database associated with the user, such that the user does not have to specifically provide the same credentials at the point of buying and/or selling an item via the corresponding payment processing providers. A user can register multiple payment processing accounts with the service center and from the GUI as shown in FIG. 7K, the user can select one of them to be associated with the current transaction.

In one embodiment, the posting helper provides a user interface to query the user concerning certain conditions of the product to be sold as shown in FIGS. 7M and 7N. Based on the condition information received from the user, the system can estimate a market price to be sold or auctioned as shown in FIG. 7O. Such an estimate may be generated by the system based on the market condition and/or other users' transactions on similar products. After the sale has been posted, the selected selling platforms are also displayed on GUI page 750 as shown in FIG. 7L.

Figure 7Q:
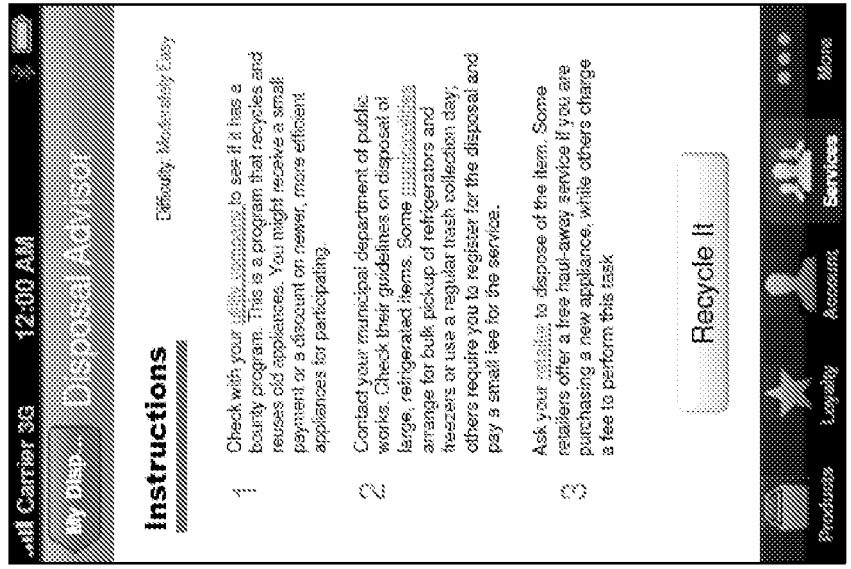
Figure 7P:
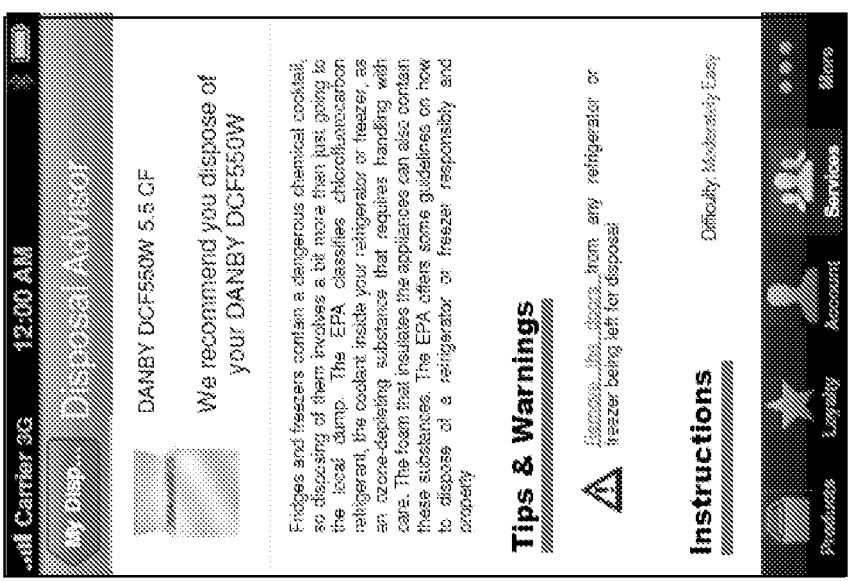

Referring back to FIG. 7I, for some products such as product 756, based on the available information, the user wishes to dispose of a product via a recycle or the processing logic may determine that it is time to recycle the product. In one embodiment, when a user attempts selling or disposing a product, a disposal helper may be displayed and utilized to collect condition information of the product. Based on the information received from the user and the market condition, the disposal helper may suggest whether the product should be disposed or sold. If the system determines that the product should be disposed, recycle button 758 is displayed, which when activated, the processing logic is configured to arrange a recycle vendor to pick up and/or dispose the corresponding product, as shown in FIGS. 7P and 7Q. The disposal helper may further provide suggestions to dispose if the user decides to dispose itself. As a result, the user does not have to individually find a recycling vendor to handle the recycle. The disposal GUI can also be displayed via link 718 of FIG. 7A. Also, note that GUIs as shown in FIGS. 4A-4D, 5A-5F, 6A-6D, and 7A-7Q are shown and described for the purposes of illustration only; other formats or layouts may also be applied herein. Also note that any button, control, or link displayed in any of FIGS. 4A-4D, 5A-5F, 6A-6D, and 7A-7Q can be activated by clicking, tapping, or via a voice interactive command.

Figure 8:
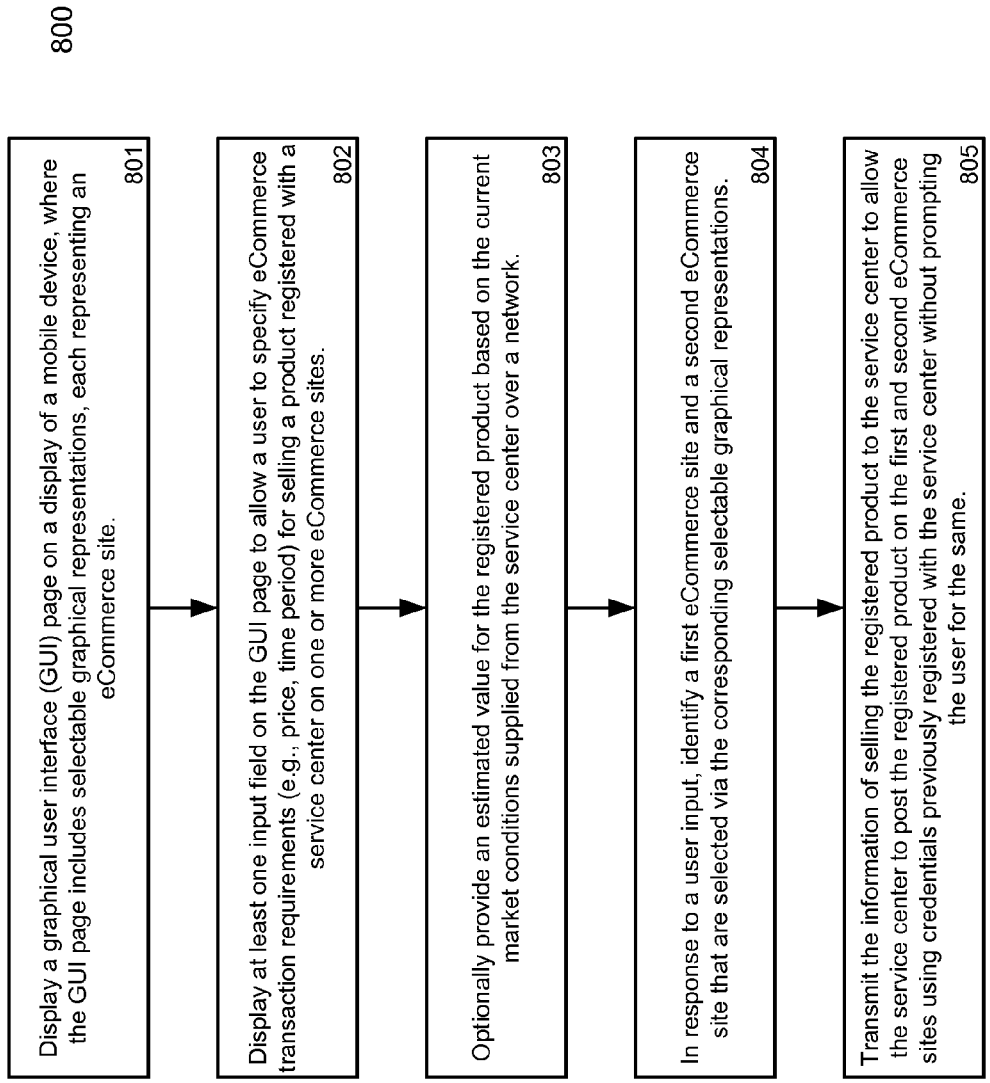
FIG. 8 is a flow diagram illustrating a method for providing life cycle product services according to another embodiment of the invention.

FIG. 8 is a flow diagram illustrating a method for providing life cycle product services according to another embodiment of the invention. Method 800 may be performed by mobile device 101 of FIG. 2. Referring to FIG. 8, at block 801, a GUI page is displayed on a mobile device. Where the GUI page includes one or more selectable graphical representations (e.g., buttons, checkboxes), each graphical representation corresponds to an eCommerce site (e.g., EBAY, AMAZON). At block 802, at least one input field is displayed on the GUI page to allow a user to specify eCommerce transaction requirements (e.g., price, time period) for selling a product registered with a service center on one or more of the selectable eCommerce sites.

At block 803, an estimated market value for the registered product is presented on the GUI page. The estimated value is retrieved from the service center, which determines the estimated market value based on the current market conditions of the same or similar products. In response to a user input, at block 804, a first and second eCommerce sites are identified based on the user selection of the corresponding graphical representation. At block 805, the information of selling the registered product is transmitted from the mobile device to the service center. The service center is configured to post the product on the first and second eCommerce sites using credentials previously registered with the service center without prompting the user for the same, in order to allow the eCommerce sites to authenticate the user for the purpose of posting the product for sales.

Figure 9:
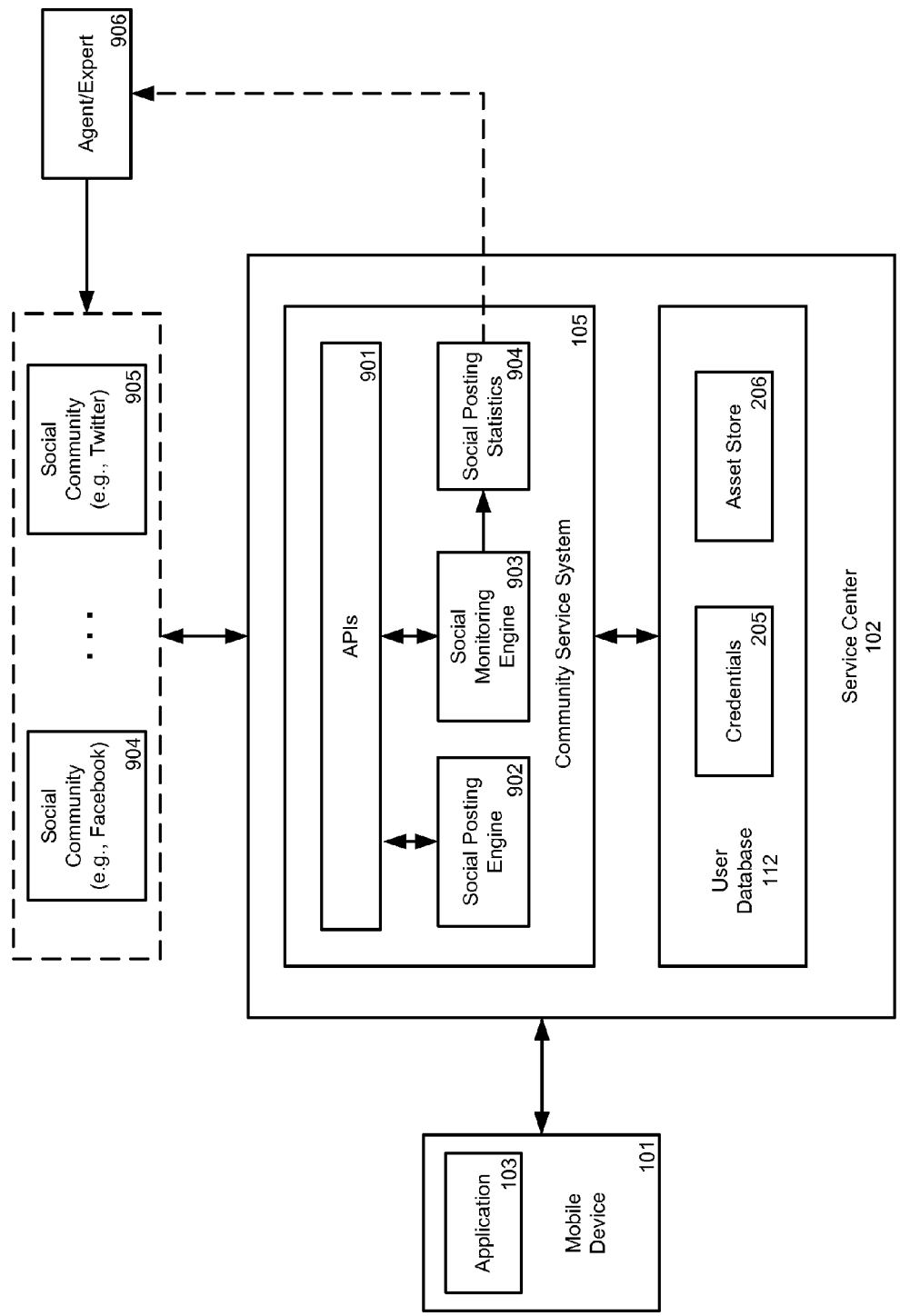
FIG. 9 is a block diagram illustrating a service center having a social community accessing platform according to one embodiment of the invention.

According to another embodiment, a service center can also provide a social community accessing platform to allow a user to access from its mobile device one or more social community to participate one or more discussion forums associated with one or more registered products. FIG. 9 is a block diagram illustrating a service center having a social community accessing platform according to one embodiment of the invention. Referring to FIG. 9, in one embodiment, community service system 105 includes, but is not limited to, social posting engine 902 and social monitoring engine 903 communicatively coupled to social communities 904-905 via APIs 901. APIs 901 may be implemented as a common API or separate APIs for accessing social communities 904-905. Social posting engine 902 allows a user to post a message via application 103 of mobile device 101 to one or more of social communities 904-905 without having to leave application 103 of mobile device 101.

According to one embodiment, when a user wishes to post a message to one or more of social communities 904-905, the user can create a message on a GUI page of application 103 and specify the social community or communities. The a request for posting a message is then transmitted from mobile device 101 to service center 102 and received by social posting engine 902. In one embodiment, the request includes information identifying a message to be posted, one or more social communities in which the message is to be posted, and a registered product associated with the posting. Based on the request, social posting engine 902 is configured to retrieve the necessary credentials from credential store 205 for accessing the social communities. The credentials for accessing social communities 904-905 may be previously registered with service center 102 and stored in credential store 205. Examples of the credentials 205 may include usernames and passwords.

Based on the registered product, social posting engine 902 can also identify one or more discussion threads or forums of social communities 904-905 that are associated with the product. Thereafter, social posting engine 902 transmits the message and the necessary credentials to one or more of social communities 904-905 for the purpose of posting the message. If a connection to a social community is unavailable, social posting engine 902 may store the post in a queue until the connection becomes available. As a result, a user does not have to provide the necessary credentials to service center 102 at the time of posting. The user may not have to identify which of the discussion forums or discussion threads in which the message should be posted. All the user needs is to specify which of the social communities and the product associated with the posting.

Similarly, when a response is received from social communities 904-905 in response to the posted message, social posting engine 902 is configured to route the response back to mobile device 101. Alternatively, the response may be routed to the user according to one or more communications channels preferred by the user, which may be configured previously and stored in user database 112 (e.g., user profile). Thus, a single message can be posted onto multiple accounts of the same social community. A single message can also be posted onto multiple accounts across multiple social communities. A social community can be hosted or maintained by a third-party social networking provider (e.g., Facebook™ Twitter™), a retailer (e.g., Amazon™, Bestbuy™), or a manufacturer (e.g., Samsung™)

According to one embodiment, community service system 105 further includes social monitoring engine 903 configured to monitor message postings to social communities 904-905 via social posting engine 902 and the responses received from social communities 904-905. In one embodiment social monitoring engine 903 is configured to collect data concerning all the social posting activities. The data collection may include, but is not limited to, user IDs and date and time of post, communities the post is made to, user accounts post is being made to, user account the post is being made from, device the post is being made from (e.g., mobile, tablet, Web), etc. Based on the monitoring, social posting statistics 907 can be generated. In one embodiment, social posting statistics 907 includes, but is not limited to, a number of posts by time and day, number of posts by day of week, number of users creating posts, number of products with posts, number of brands or loyalty with posts, and products least posted about, etc.

In one embodiment, an enhanced analysis may be performed on the collected data and statistics to identify trends, activities based on events, or others, including, but not limited to, most social channels used to post, the types of accounts (e.g., user accounts, manufacturers/loyalty accounts or both) of the posts, products associated with the posts, services associated with the posts, the brands associated with the posts, number of the posts by products and services, and times of day and days of week of the posts, etc.

Social monitoring engine 903 is configured to monitor a social environment gathering data about topics posted in communities 904-905. In one embodiment, social monitoring engine 903 is configured to identify posts that have both positive and/or negative sentiment regarding a product or brand. Social monitoring engine 903 may also identify activities based on either the positive or negative sentiment such as whether the traffic is heavy on the topic, whether a positive sentiment is trending negative, and whether a negative sentiment is trending positive. Social monitoring engine 903 may also determine other social community sites that are discussing the same or similar topics or trends. Social monitoring engine 903 may also determine the most active users participating in the community and/or whether the community is working to find a solution or the community needs an assistance to move forward. The sentiment data or social statistics 907 can be utilized by agent/expert/specialist 906 to participate in the discussion, for example, by interjecting comments into a negative discussion and attempting to turn it positive, or identifying a solution that the community has found to be positive and posts to other communities that may not have knowledge of the resolution. The solution or comments posted in a discussion forum may also be converted into knowledgebase (e.g., KB 113 of FIG. 1) for future references.

In one embodiment, based on the monitoring, a user having participated in a discussion and posted positive comments about a product may be rewarded by the service center, a retailer, and/or a manufacturer associated with the product. A user having posted a negative comment about a product may be contacted by an agent, expert, or specialist to resolve the issues in an attempt to turn the negative experience into a positive one.

Figure 10:
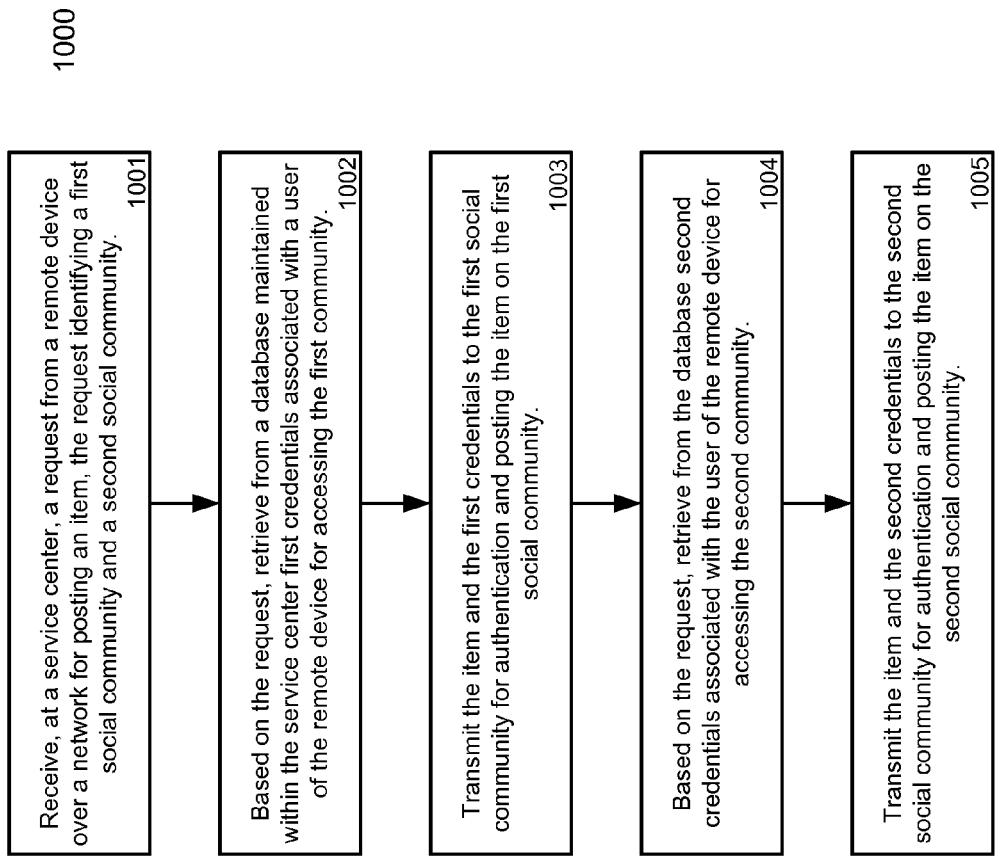
FIG. 10 is a flow diagram illustrating a method for social posting via a service center according to one embodiment of the invention.

FIG. 10 is a flow diagram illustrating a method for social posting via a service center according to one embodiment of the invention. Method 1000 may be performed by community service system 105 of FIG. 9. Referring to FIG. 10, at block 1001, a service center receives a request from a mobile device over a network for posting an item. The request identifies a first social community and a second social community. At block 1002, based on the request, first credentials associated with the user for accessing the first social community is retrieved from a database. At block 1003, the item and the first credentials are transmitted to the first social community for authentication of the user and posting the item on the first social community. At block 1004, based on the request, second credentials associated with the user for accessing the second social community are retrieved from the database. At block 1005, the item and the second credentials are transmitted to the second social community for authentication of the user and posting the item on the second social community. As a result, the user does not have to provide the credentials at the point in time of the posting.

Figure 11:
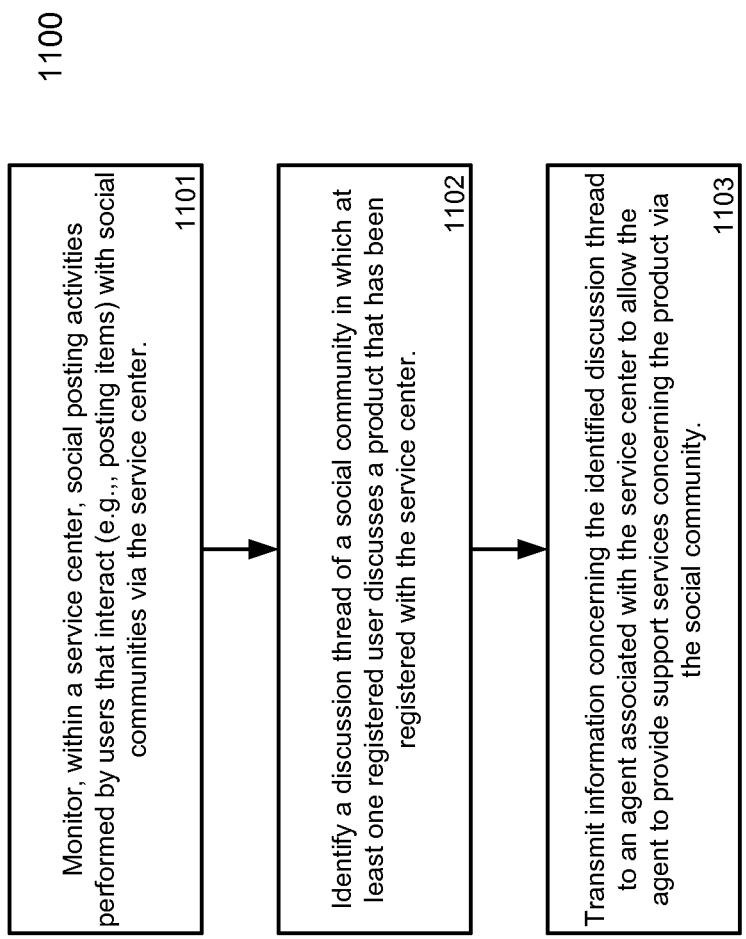
FIG. 11 is a flow diagram illustrating a method for monitoring social posting via a service center according to one embodiment of the invention.

FIG. 11 is a flow diagram illustrating a method for monitoring social posting via a service center according to one embodiment of the invention. Method 1100 may be performed by community service system 105 of FIG. 9. Referring to FIG. 11, at block 1101, processing logic monitors social posting activities performed by users via a service center. At block 1102, a discussion thread or forum of a social community is identified in which at least registered user discusses a product that has been registered with the service center. At block 1103, the information concerning the identified discussion thread is transmitted to an agent or specialist associated with the service center to allow the agent or specialist to provide support services concerning the product via the social community.

Figure 12A:
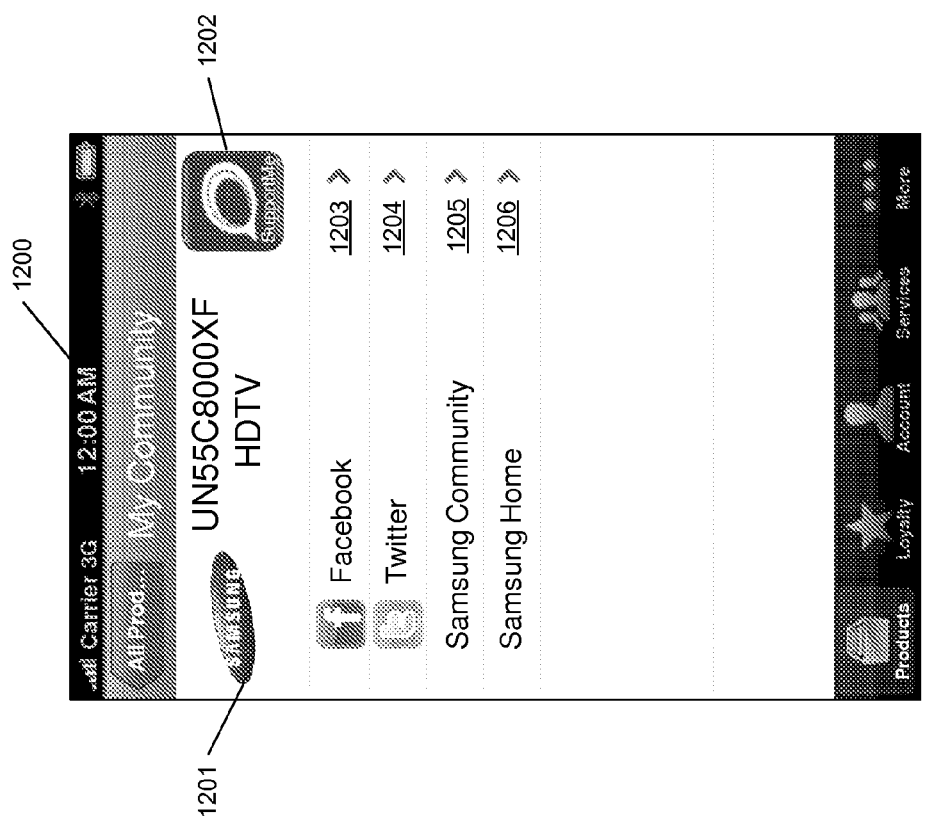
FIGS. 12A-12C are screenshots illustrating graphical user interfaces for posting items on social communities according to one embodiment of the invention.
Figures 12B, 12C:
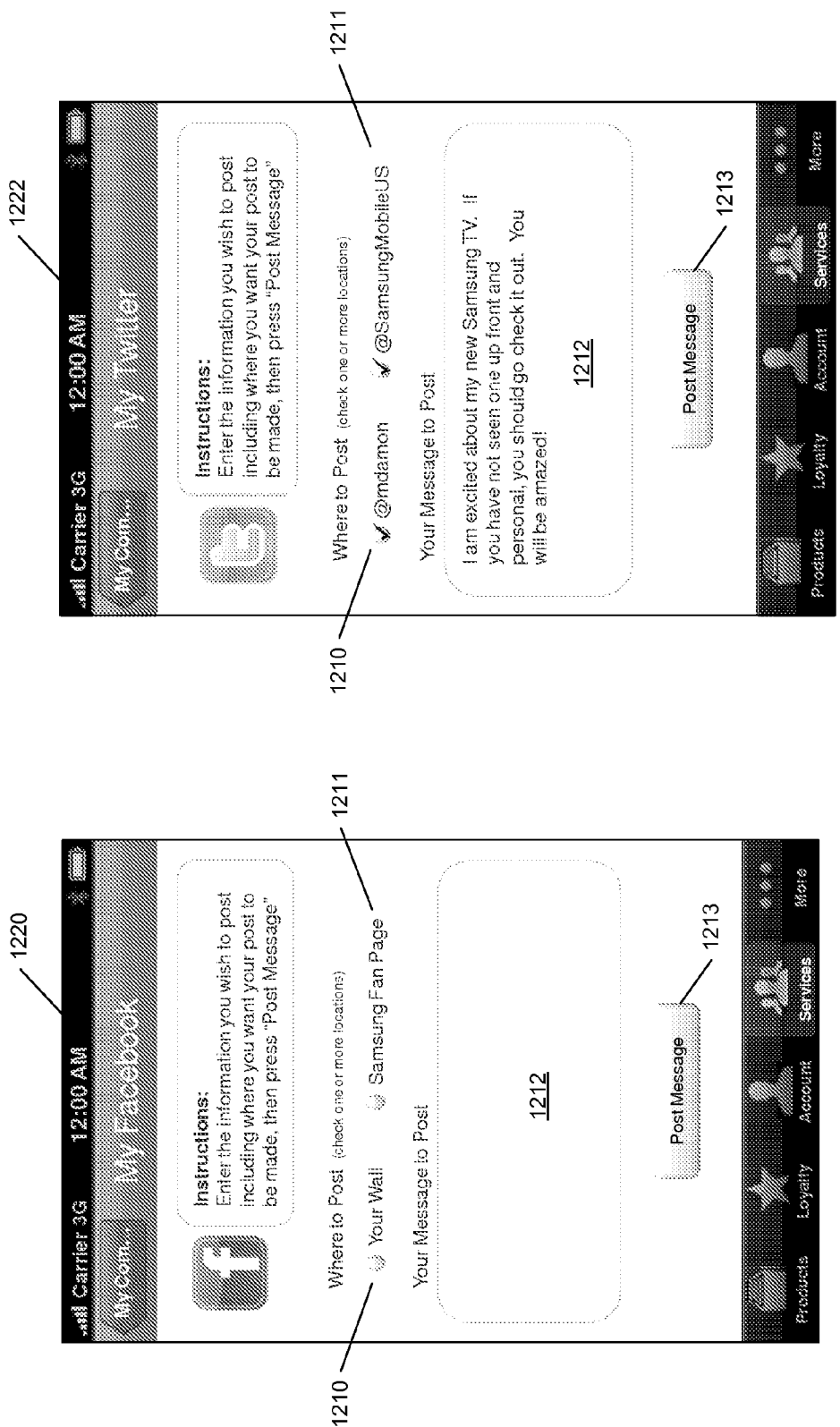

FIGS. 12A-12C are screenshots illustrating graphical user interfaces for posting items on social communities according to one embodiment of the invention. GUI 1200 may be activated from link 538 of FIG. 5D or link 626 of FIG. 6D. Referring to FIG. 12A, GUI 1200 displays a title or abstract 1201 of a particular product and a support button 1202. A user can activate support button 1202 to contact an agent or expert for support services as described above with respect to FIGS. 5A-5F.

In addition, GUI 1200 includes a list of social communities 1203-1206 that the user has previously registered with the service center, including providing the necessary credentials for accessing social communities 1203-1206, as described above with respect to FIGS. 4A-4D. The credentials are stored within the service center, for example, as part of a user database or user profile associated with the user. A user can select or activate any of the social community links 1203-1206 to post a message to the selected social community or communities.

For example, if a user selects link 1203, a posting page associated with selected social community is displayed as shown in FIG. 12B. Referring to FIG. 12B, GUI 1220 includes one or more graphical representations 1210-1211 representing different accounts associated with social community 1203. A graphical representation can be an icon, a button, or a checkbox, etc. GUI 1220 also includes an input field 1212 to allow a user to enter a message to be posted to one or more of accounts 1210-1211, which may be selected by activating or selecting the corresponding graphical representations. Once the message has been entered in input field, the user can activate button 1213 to post the message to the selected social communities.

In response to the activation of button 1213, the underlying application is configured to transmit the message, the associated product identifier, and identifier(s) identifying one or more social communities to the service center. The service center can then compile the necessary detailed product information to determine one or more discussion threads or forums, as well as the necessary credentials for accessing the selected social communities. Thereafter, the service center posts the message to the identified discussion threads of selected social communities on behalf of the user using associated credentials. As a result, the user does not have to identify the discussion threads or provide the necessary credentials for accessing the selected social communities. Similarly, a user can post a message in community 1204 via GUI 1222 as shown in FIG. 12C.

Note that a single message can be posted, via a single transaction from a mobile device, on different social communities, different accounts of the same social community, or different accounts on different social communities. Also note that the GUIs as shown in FIGS. 12A-12C are described for illustration purpose only; other layouts or formats may also be applied. Any of the selectable graphical representations described herein can be activated via a keystroke on a keyboard, a mouse click, tapping or swiping on a touch screen, and/or a voice command, etc.

Figure 13:
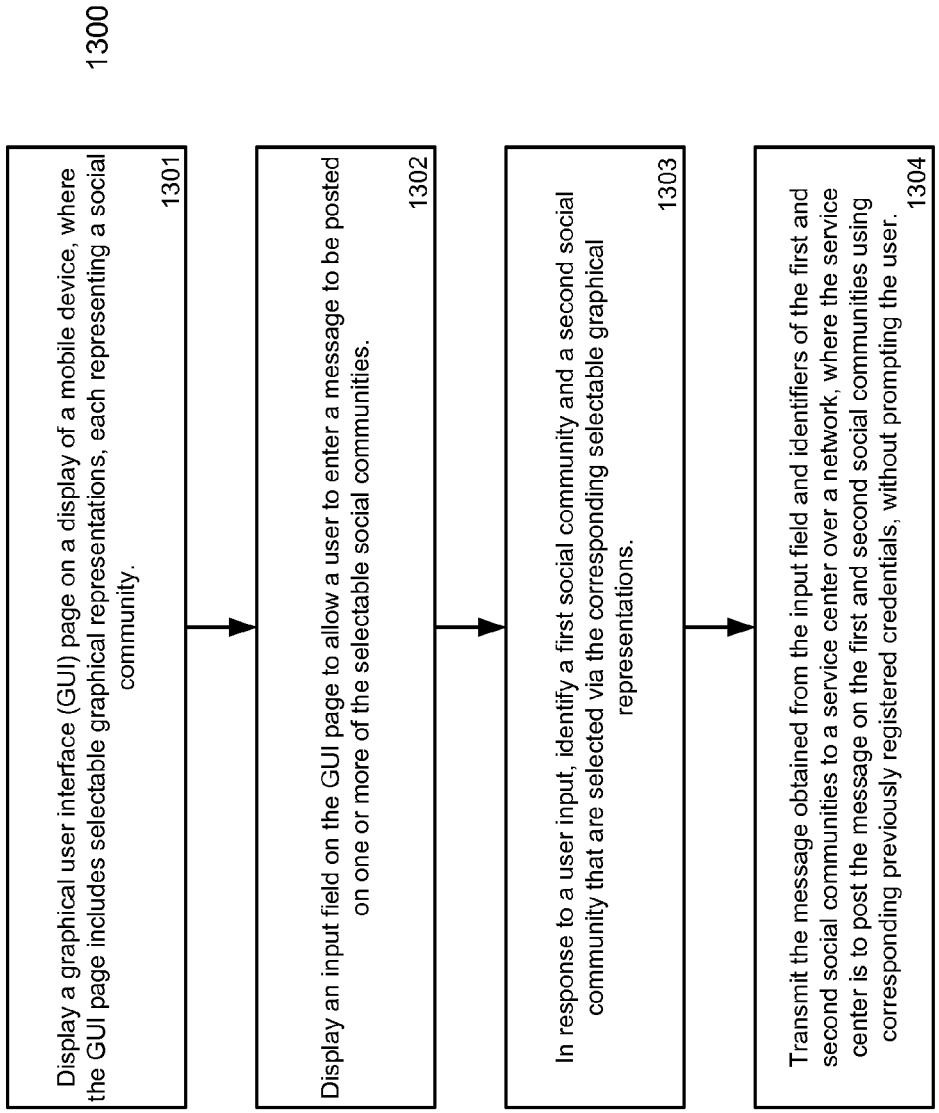
FIG. 13 is a flow diagram illustrating a method for posting a message on a social community according to one embodiment of the invention.

FIG. 13 is a flow diagram illustrating a method for posting a message on a social community according to one embodiment of the invention. Method 1300 may be performed by processing logic of mobile device 101 of FIG. 9, which may include software, hardware, or a combination thereof. Referring to FIG. 13, at block 1301, processing logic displays a GUI page on a display of a mobile device, where the GUI page includes one or more selectable graphical representations, each representing a social community. In addition, at block 1302, an input field is displayed on the GUI page to allow a user to enter a message to be posted on one or more of the selectable social communities. At block 1303, in response to a user input, processing logic identifies a first social community and a second social community that are selectable via the corresponding selectable graphical representations. At block 1304, processing logic transmits the message obtained from the input field and the identifiers identifying the first and second social communities to a service center over a network. The service center is configured to post the message on behalf of the user on the first and second social communities using the corresponding previously registered credentials without prompting the user for the same.

As described above, a service center may often receive messages from a variety of sources, where the messages may or may not be related to registered products within the service center. Some of the messages may be useful or interesting to the users such as promotions or rewards of the products. Others may be important to the users such as recall notifications of the products. According to some embodiments, the service center is configured to route the messages to the registered users based on users' settings.

Figure 14:
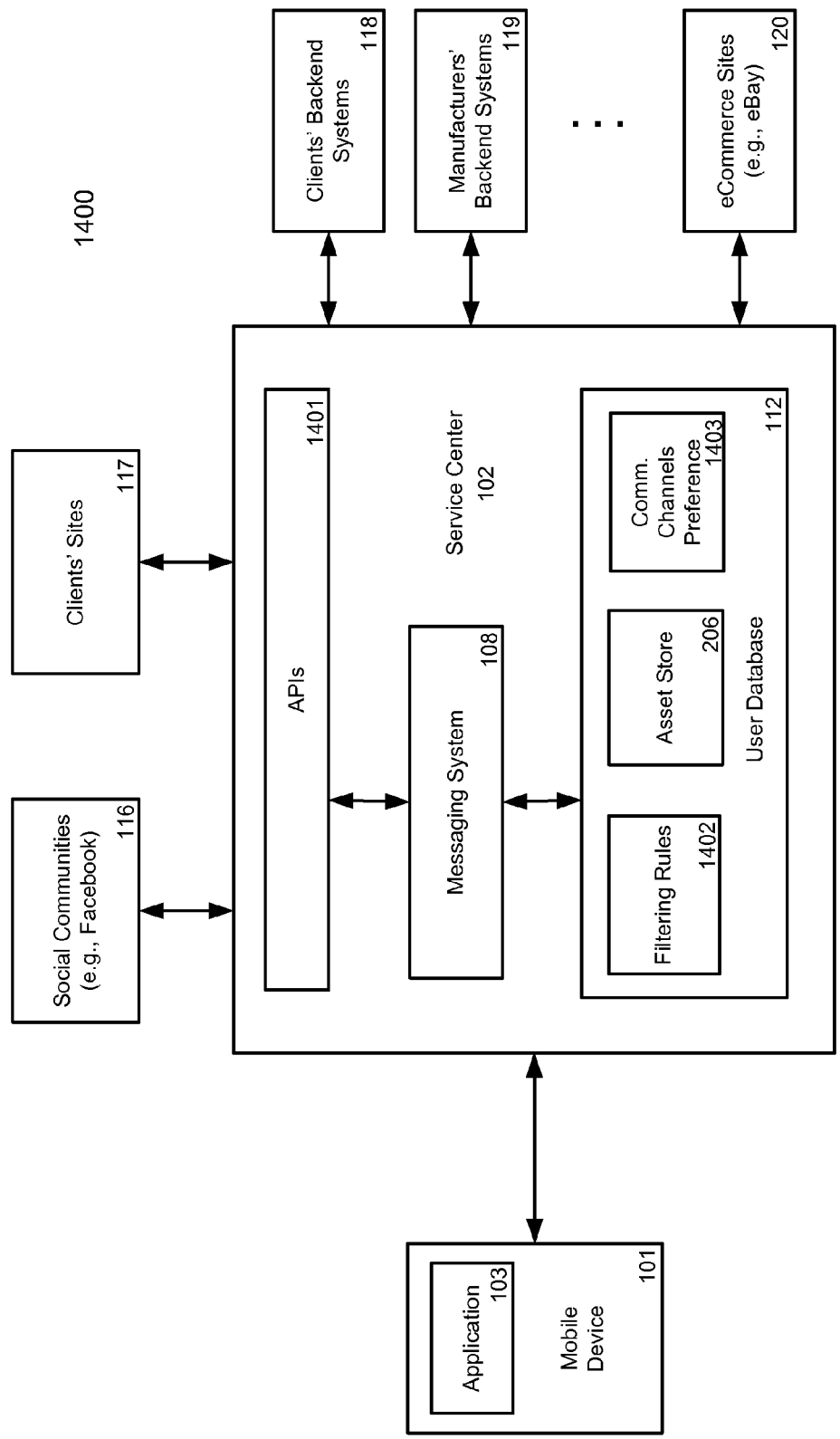
FIG. 14 is a block diagram illustrating a system for processing messages within a service center according to one embodiment of the invention.

FIG. 14 is a block diagram illustrating a system for processing messages within a service center according to one embodiment of the invention. System 1400 may be implemented as part of system 100 of FIG. 1. Referring to FIG. 14, service center 102 includes messaging system 108 to receive, via one or more APIs 1401, from a variety of sources, such as social communities 116, client sites 117, client backend systems 118, manufacturer backend systems 119, and eCommerce sites 120. The messages may or may not be related to registered products stored in asset store 206 of user database 112 associated with the registered users. For example, a message may be an advertisement received from a retailer or manufacturer, including, but is not limited to, a promotion of a related product or accessory to a registered product, a discount coupon, an upgrade, or a service schedule reminder, etc. Alternatively, a message may be a recall notification concerning a registered product of a user.

In one embodiment, a user can configure a set of one or more filtering rules 1402 specifying whether a particular type of messages should be routed to the user. Filtering rules 1402 may also specify whether a message or a particular type of messages associated with a particular registered product should be received by the user. Filtering rules 1402 can also specify whether a message received from a particular source should be forwarded to the user. In one embodiment, certain types of messages are not available to be filtered out. For example, any recall message of any registered product must be routed to users, regardless of the configuration of filtering rules 1402. A message may be routed to a user using one or more communications channels configured by the user and stored in communications channel preference 1403.

In one embodiment, in response to a message received one of sources 116-120, message system 108 is configured to determine whether the message should be routed to a user associated with mobile device 101 based on a set of filtering rules 1402 associated with the user. If filtering rules 1402 permit, the message is routed to mobile device 101 or one of other devices associated with the user dependent upon the settings of communications channel preference 1403. Certain types of messages such as recall notifications may be routed to the user regardless of the filtering settings. As described above, the message may be related to a registered product specified in asset store 206 of the user. Alternatively, the message may be related to other products or services that are likely interesting to the user, for example, based on user's interactive history, habits, and/or registered products or services, which may be determined over a period of time by an analysis module (not shown) within the service center 102.

FIGS. 15A-15F are screenshots illustrating examples of GUIs for setting filtering rules from a mobile device according to certain embodiments of the invention. GUIs as shown in FIGS. 15A-15F may be presented by mobile device 101 of FIG. 14. Referring FIG. 15A, GUI 1500 may be presented as part of preference setting GUIs as shown in FIG. 4D. In one embodiment, GUI 1500 includes a list of one or more categories of message filtering, in this example, advertisement message filtering. In this example, categories include manufacturer category 1501, loyalty category 1502, and social community category 1503. However, other categories may also be included, which may be user configurable. Each of categories 1501-1503 may include zero or more entities. A user can configure each of the entities included in each of categories 1501-1503 by selecting the corresponding links 1501-1503.

Figures 15A, 15B:
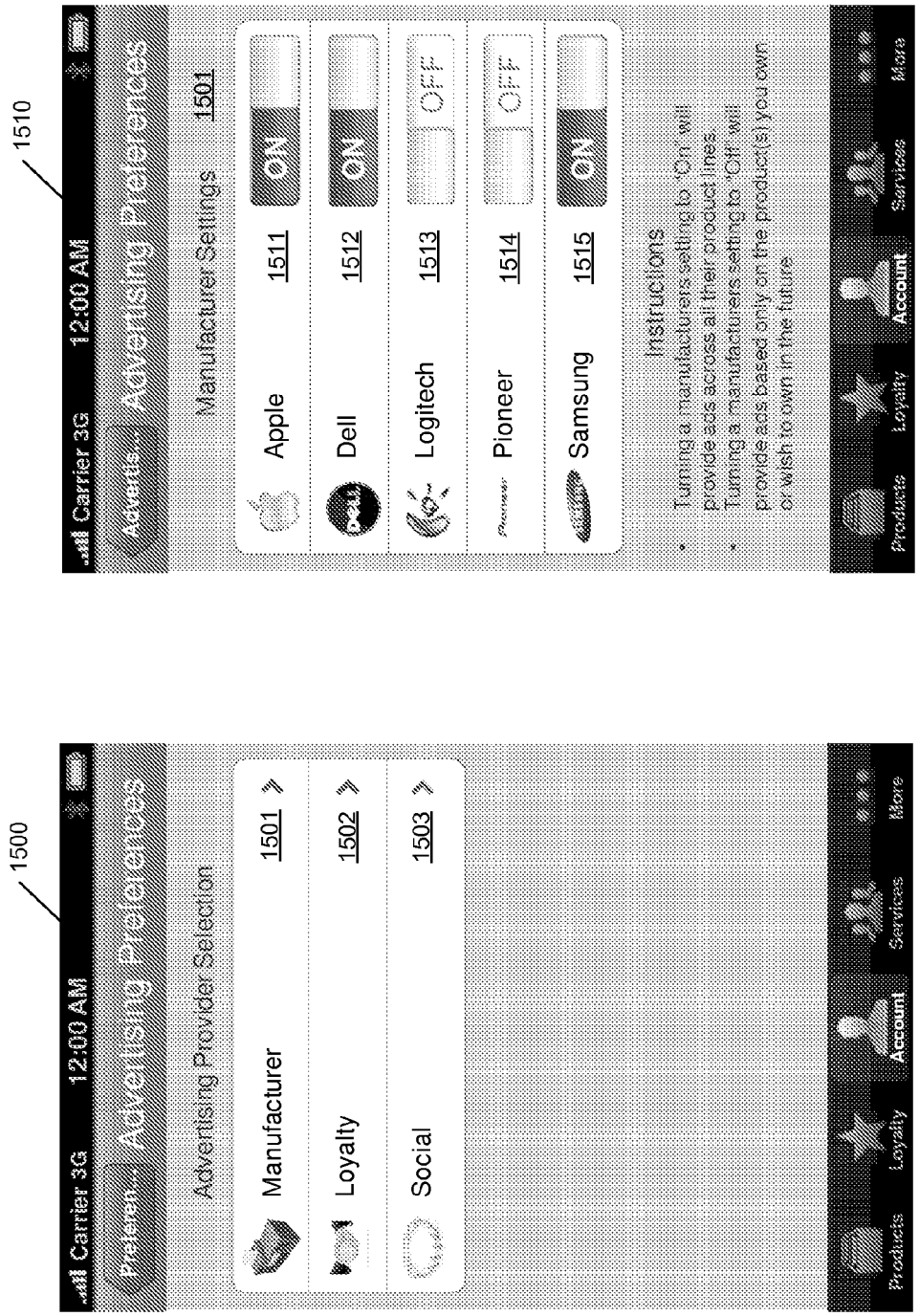
FIGS. 15A-15F are screenshots illustrating examples of GUIs for setting filtering rules from a mobile device according to certain embodiments of the invention.
Figure 15D:
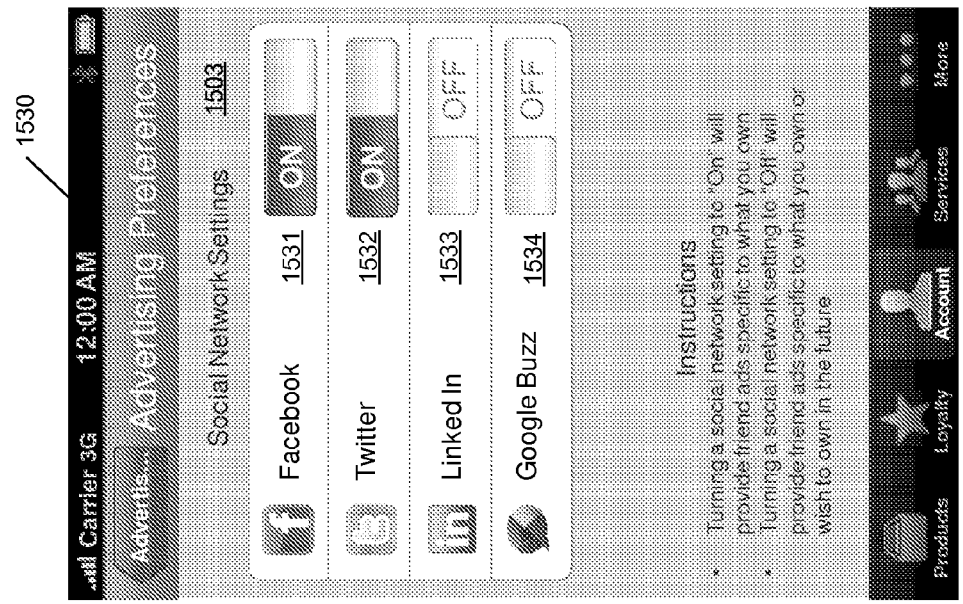
Figure 15C:
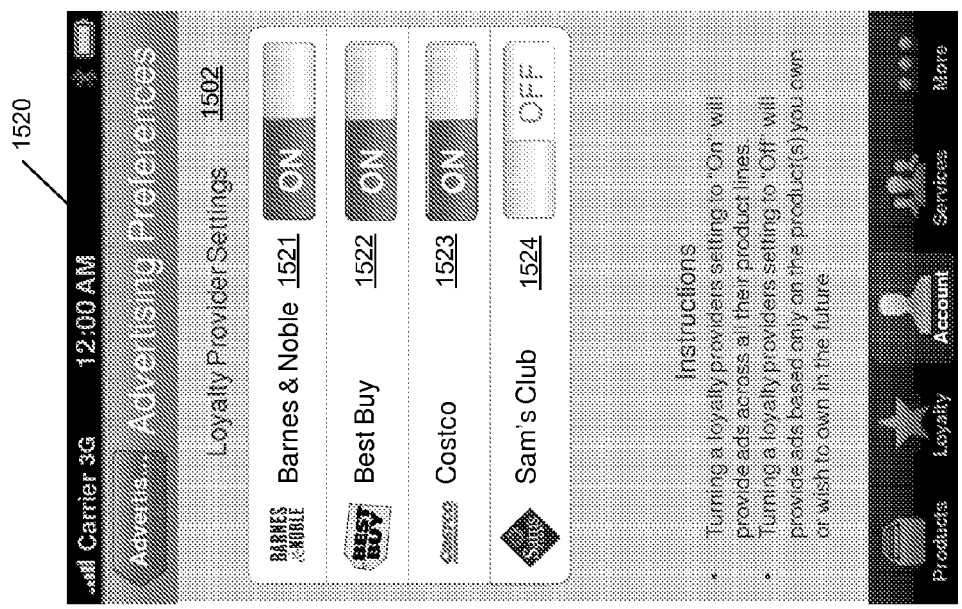
Figure 15F:
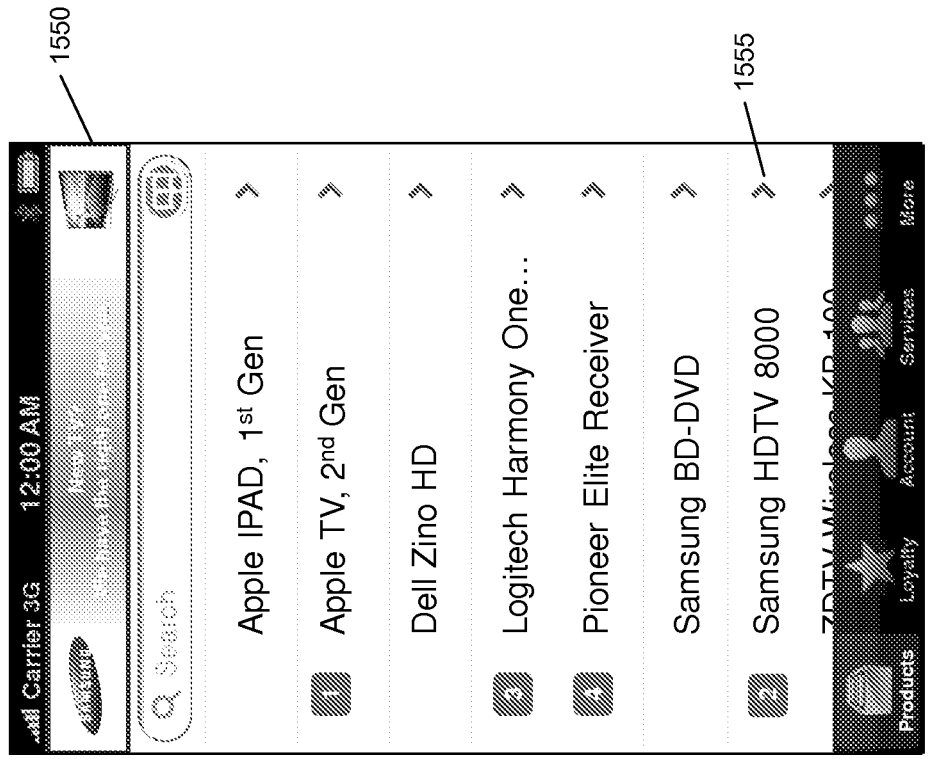
Figure 15E:
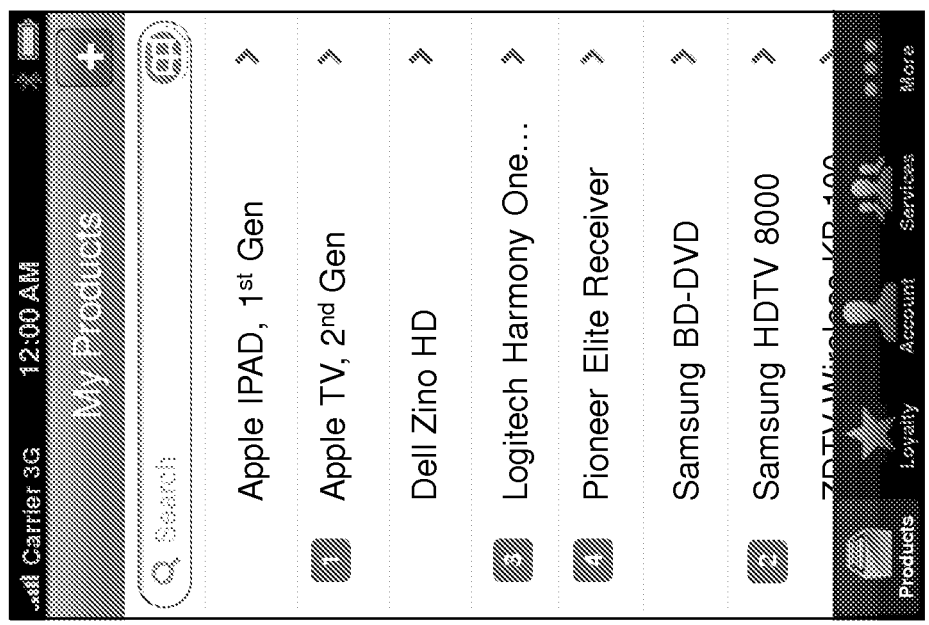

According to one embodiment, when a user activates link 1501, GUI page 1510 is displayed as shown in FIG. 15B. Referring to FIG. 15B, GUI page 1510 includes a list of one or more manufacturers 1511-1515. Each of manufacturers 1511-1515 can be turned on or off to receive message from the corresponding manufacturer. Similarly, a user can also activate links 1502 and 1503 to display GUI page 1520 having a list of retailers 1521-1524 and GUI page 1530 having a list of social communities 1531-1534, respectively, where each of entities 1521-1524 and 1531-1534 can be individually turned on or off to receive messages from the corresponding entity. FIG. 15E is a screenshot of a regular display of registered products while FIG. 15F is a screenshot when the device receives an advertisement message 1550, which may be related to registered product 1555.

The settings of these filtering rules are then transmitted from the mobile device to a service center to be stored in a database associated with the user. In addition, the application may also allow a user keep a set of local filtering rules within the local device in addition to those stored at the service center. That is, a user may have multiple devices communicatively coupled to the service center and each device may have a local set of filtering rules, while all devices share a global set of filtering rules stored in the service center. In this way, a message may be routed to a first of user's devices, but is blocked to be displayed on a second of the user's devices. For example, a text message may be sent to user's mobile device while a content rich message (e.g., images or video) may be sent to a desktop of the user, for example, based on the available communications bandwidth.

FIG. 16 is a flow diagram illustrating a method for processing messages according to one embodiment of the invention. Method 1600 may be performed by messaging system 108 of service center 102 of FIG. 14. Referring to FIG. 16, at block 1601, a request is received from a mobile device for registering a product at a service center. The request includes a machine-readable code uniquely identifying the product and filtering preference of messages to be received from the associated parties such as retailers, manufacturers, and social communities. At block 1602, processing logic compiles product information based on the machine-readable code without requiring the user to provide the same. In addition, processing logic configures a set of filtering rules associated with the registered products and/or vendors of the registered products. Subsequently at block 1603, in response to a message (e.g., advertisement) from a party received at the service center, the service center identifies a registered product associated with the party. At block 1604, a filtering rule is determined to determine whether the message should be routed to the user. At block 1605, the message is transmitted to the user if the rules permit.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving, at a service center, a request for posting a message from a mobile device over a network, the request identifying a first discussion forum and a second discussion forum, the message pertaining to a product previously registered with the service center by a user;
transmitting to a first server hosting the first discussion forum over the network the message and first credentials retrieved from a database associated with the service center to allow the first discussion forum to authenticate the user in order to post the message on the first discussion forum; and
transmitting to a second server hosting the second discussion forum over the network the message and second credentials retrieved from the database to allow the second discussion forum to authenticate the user in order to post the message on the second discussion forum, wherein the message is posted without requiring the user to provide the first and the second credentials at time of posting the message.

2. The method of claim 1, wherein the first and second credentials were previously registered with the service center by the user via the mobile device, such that the user does not have to provide the first and second credentials at the time of posting the message to the first and second discussion forums.

3. The method of claim 1, further comprising:
determining a product associated with the message based on the request, wherein the product was previously registered with the service center;
posting the message in a first discussion thread of the first discussion forum that discusses the product; and
posting the message in a second discussion thread of the second discussion forum that discusses the product.

4. The method of claim 3, further comprising:
in response to a first response to the message received from the first discussion forum, transmitting the first response to the mobile device over the network; and
in response to a second response to the message received from the second discussion forum, transmitting the second response to the mobile device over the network, such that the user does not have to individually access the first and second discussion forums to retrieve the first and second responses.

5. The method of claim 3, wherein the product was registered by transmitting a machine readable code uniquely identifying the product from the mobile device to the service center, wherein the machine-readable code was obtained by scanning the product using a scanner of the mobile device, and wherein the service center is configured to compile the detailed information of the product without specifically providing detailed information of the product.

6. The method of claim 3, further comprising:
monitoring messages posted via the service center in at least one of the first discussion thread and the second discussion thread to generate discussion sentiment data; and
transmitting the discussion sentiment data to an agent to enable the agent to participate in at least one of the first and second discussion threads to provide an answer to a question or a solution to a problem discussed therein.

7. The method of claim 3, further comprising establishing a communications session between an agent and the user based on at least one of the first and second responses to enable the agent to provide further support services to the registered product, wherein the communications session is established using a communications channel that is preferred by the user and is available to the agent.

8. The method of claim 1, further comprising:
receiving a second request for selling the product from the mobile device, the second request identifying an eCommerce site and including a price for selling the product;
in response to the second request, retrieving third credentials from the database required by a third server that hosts the eCommerce site; and
transmitting a sale request to the third server for selling the product, including the sale price and the third credentials for authenticating the user of the mobile device, without requiring the user to provide the third credentials.

9. The method of claim 1, further comprising:
receiving a third request to dispose the product from the mobile device; and
in response to the third request, arrange a disposal facility to contact the user of the mobile device to recycle the product.

10. A computer-readable storage medium having instructions stored therein, which when executed by a computer, cause the computer to perform a method, the method comprising:
receiving, at a service center, a request for posting a message from a mobile device over a network, the request identifying a first discussion forum and a second discussion forum, the message pertaining to a product previously registered with the service center by a user;
transmitting to a first server hosting the first discussion forum over the network the message and first credentials retrieved from a database associated with the service center to allow the first discussion forum to authenticate the user in order to post the message on the first discussion forum; and
transmitting to a second server hosting the second discussion forum over the network the message and second credentials retrieved from the database to allow the second discussion forum to authenticate the user in order to post the message on the second discussion forum, wherein the message is posted without requiring the user to provide the first and the second credentials at time of posting the message.

11. The computer-readable storage medium of claim 10, wherein the first and second credentials were previously registered with the service center by the user via the mobile device, such that the user does not have to provide the first and second credentials at the time of posting the message to the first and second discussion forums.

12. The computer-readable storage medium of claim 10, wherein the method further comprises:
determining a product associated with the message based on the request, wherein the product was previously registered with the service center;
posting the message in a first discussion thread of the first discussion forum that discusses the product; and
posting the message in a second discussion thread of the second discussion forum that discusses the product.

13. The computer-readable storage medium of claim 12, wherein the method further comprises:
in response to a first response to the message received from the first discussion forum, transmitting the first response to the mobile device over the network; and
in response to a second response to the message received from the second discussion forum, transmitting the second response to the mobile device over the network, such that the user does not have to individually access the first and second discussion forums to retrieve the first and second responses.

14. The computer-readable storage medium of claim 12, wherein the product was registered by transmitting a machine readable code uniquely identifying the product from the mobile device to the service center, wherein the machine-readable code was obtained by scanning the product using a scanner of the mobile device, and wherein the service center is configured to compile the detailed information of the product without specifically providing detailed information of the product.

15. The computer-readable storage medium of claim 12, wherein the method further comprises:
monitoring messages posted via the service center in at least one of the first discussion thread and the second discussion thread to generate discussion sentiment data; and
transmitting the discussion sentiment data to an agent to enable the agent to participate in at least one of the first and second discussion threads to provide an answer to a question or a solution to a problem discussed therein.

16. The computer-readable storage medium of claim 12, wherein the method further comprises establishing a communications session between an agent and the user based on at least one of the first and second responses to enable the agent to provide further support services to the registered product, wherein the communications session is established using a communications channel that is preferred by the user and is available to the agent.

17. The computer-readable storage medium of claim 10, wherein the method further comprises:
 receiving a second request for selling the product from the mobile device, the second request identifying an eCommerce site and including a price for selling the product;
 in response to the second request, retrieving third credentials from the database required by a third server that hosts the eCommerce site; and
 transmitting a sale request to the third server for selling the product, including the sale price and the third credentials for authenticating the user of the mobile device, without requiring the user to provide the third credentials.

18. The computer-readable storage medium of claim 10, wherein the method further comprises:
 receiving a third request to dispose the product from the mobile device; and
 in response to the third request, arrange a disposal facility to contact the user of the mobile device to recycle the product.

* * * * *